(12) United States Patent
Beck et al.

(10) Patent No.: US 12,528,404 B2
(45) Date of Patent: Jan. 20, 2026

(54) VEHICLE STATUS INDICATOR SYSTEMS WITH ENHANCED ASSEMBLIES, ACTUATOR DEVICES, AND ILLUMINATION FEATURES

(71) Applicant: Specialty Manufacturing, Inc., Belton, MO (US)

(72) Inventors: Michael Beck, Huntersville, NC (US); Christopher Egan, Huntersville, NC (US); Walker Coriell Clark, Charlotte, NC (US)

(73) Assignee: Specialty Manufacturing, Inc., Belton, MO (US)

( * ) Notice: Subject to any disclaimer, the term of this patent is extended or adjusted under 35 U.S.C. 154(b) by 174 days.

(21) Appl. No.: 17/959,006

(22) Filed: Oct. 3, 2022

(65) Prior Publication Data

US 2023/0226968 A1 Jul. 20, 2023

Related U.S. Application Data

(60) Provisional application No. 63/322,769, filed on Mar. 23, 2022, provisional application No. 63/228,408, filed on Aug. 2, 2021.

(51) Int. Cl.
  *B60Q 1/32* (2006.01)
  *B60Q 1/00* (2006.01)
  *B60Q 1/26* (2006.01)

(52) U.S. Cl.
  CPC .......... *B60Q 1/324* (2022.05); *B60Q 1/0094* (2013.01); *B60Q 1/2615* (2013.01); *B60Q 1/2692* (2013.01); *B60Q 2400/20* (2013.01)

(58) Field of Classification Search
  CPC .... B60Q 1/324; B60Q 1/0094; B60Q 1/2615; B60Q 1/2692; B60Q 2400/20; B60Q 1/503
  USPC ........................................................ 340/433
  See application file for complete search history.

(56) References Cited

U.S. PATENT DOCUMENTS

| | | | | |
|---|---|---|---|---|
| 2,851,674 | A * | 9/1958 | Boone ................... | B60Q 1/387 340/475 |
| 5,119,278 | A * | 6/1992 | Watson ................ | B60Q 1/5035 362/505 |
| 5,604,480 | A * | 2/1997 | Lamparter ............. | B60Q 1/544 362/478 |
| 5,634,287 | A * | 6/1997 | Lamparter ............. | B60Q 1/503 362/540 |
| 5,635,902 | A * | 6/1997 | Hochstein .............. | B60Q 1/503 340/471 |
| 5,796,331 | A * | 8/1998 | Lamparter .......... | G09F 13/0472 116/28 R |
| 6,009,650 | A * | 1/2000 | Lamparter ................ | G09F 9/33 362/478 |
| 6,099,933 | A * | 8/2000 | Lamparter ............. | G09F 13/04 428/122 |

(Continued)

*Primary Examiner* — Eric Blount
(74) *Attorney, Agent, or Firm* — Leech Tishman Fuscaldo & Lampl, LLC

(57) ABSTRACT

For a variety of different kinds of vehicles, such as school buses and other types of vehicles, various embodiments of vehicle status indicator systems including sign components are provided. Enhancements are described in association with status indicator assemblies, actuator devices for extending and closing sign components, and sign component illumination features.

17 Claims, 36 Drawing Sheets

(56) References Cited

U.S. PATENT DOCUMENTS

| | | | | |
|---|---|---|---|---|
| 6,515,583 B1* | 2/2003 | Lamparter | ............. | B60Q 1/503 |
| | | | | 340/815.45 |
| 6,765,481 B2* | 7/2004 | Haigh | ..................... | G09F 21/04 |
| | | | | 340/545.4 |
| 7,005,973 B2* | 2/2006 | Haigh | ..................... | G09F 21/04 |
| | | | | 340/545.4 |
| 7,121,700 B1* | 10/2006 | Scanlon | ................ | G09F 21/042 |
| | | | | 362/183 |
| 10,062,309 B1* | 8/2018 | Ringer | ................... | B60Q 1/547 |
| 11,170,673 B2* | 11/2021 | Gamble | ................... | G09F 13/18 |
| 11,348,491 B2* | 5/2022 | Gamble | ................... | G09F 13/14 |
| 11,554,715 B2* | 1/2023 | Yudelevich | ............ | B60Q 1/503 |
| 2003/0089011 A1* | 5/2003 | Haigh | ..................... | G09F 21/04 |
| | | | | 40/423 |
| 2006/0061487 A1* | 3/2006 | Heap | ....................... | G09F 13/22 |
| | | | | 340/908 |
| 2007/0283604 A1* | 12/2007 | Kaoh | ..................... | G09F 13/22 |
| | | | | 40/552 |
| 2019/0272779 A1* | 9/2019 | Gamble | ............... | B60Q 1/2626 |
| 2019/0329704 A1* | 10/2019 | Ringer | ................ | B60Q 1/2692 |
| 2021/0086688 A1* | 3/2021 | Gucwa | ................ | B60Q 1/2615 |
| 2021/0221283 A1* | 7/2021 | Yudelevich | .......... | B60Q 1/2692 |

* cited by examiner

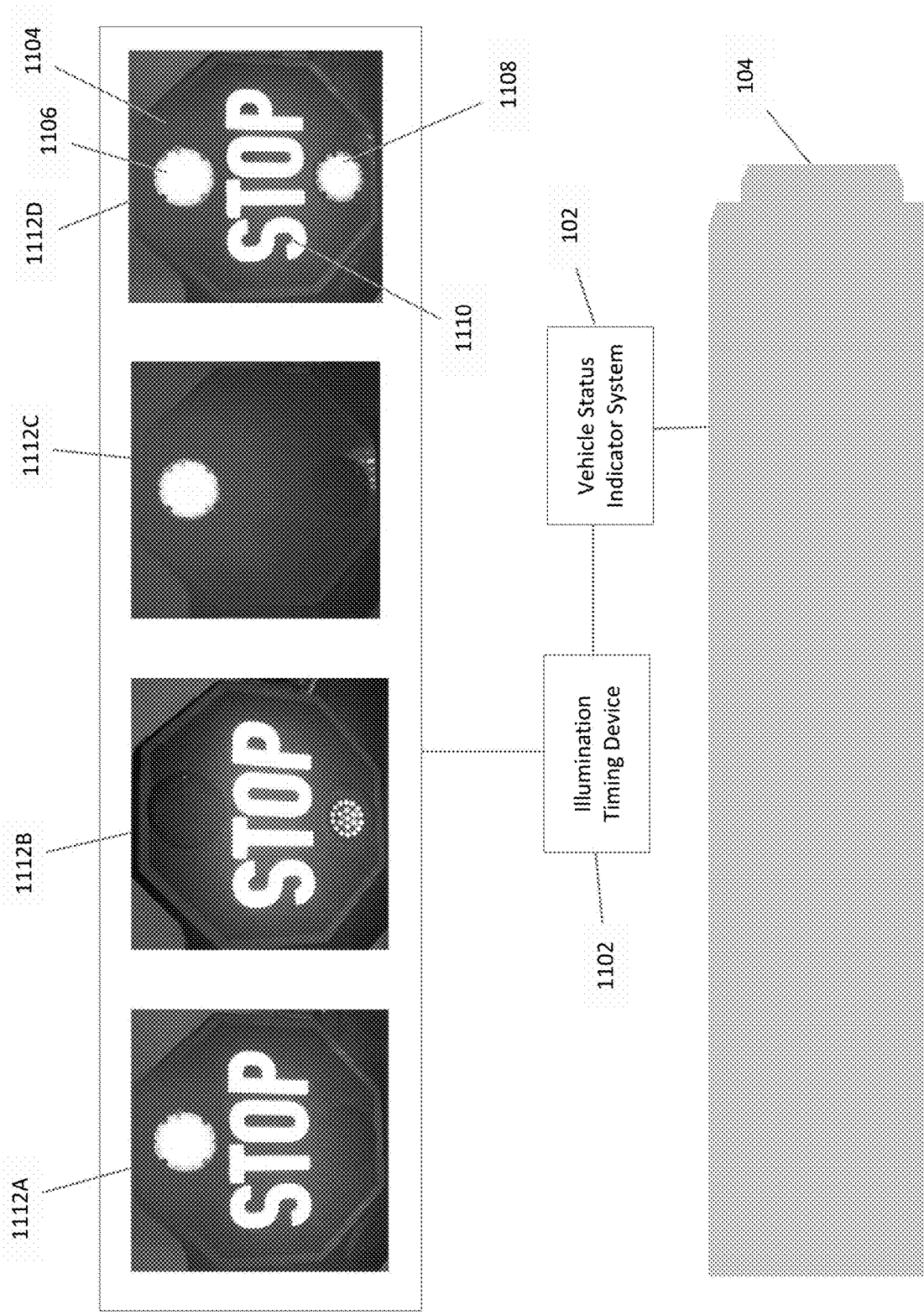

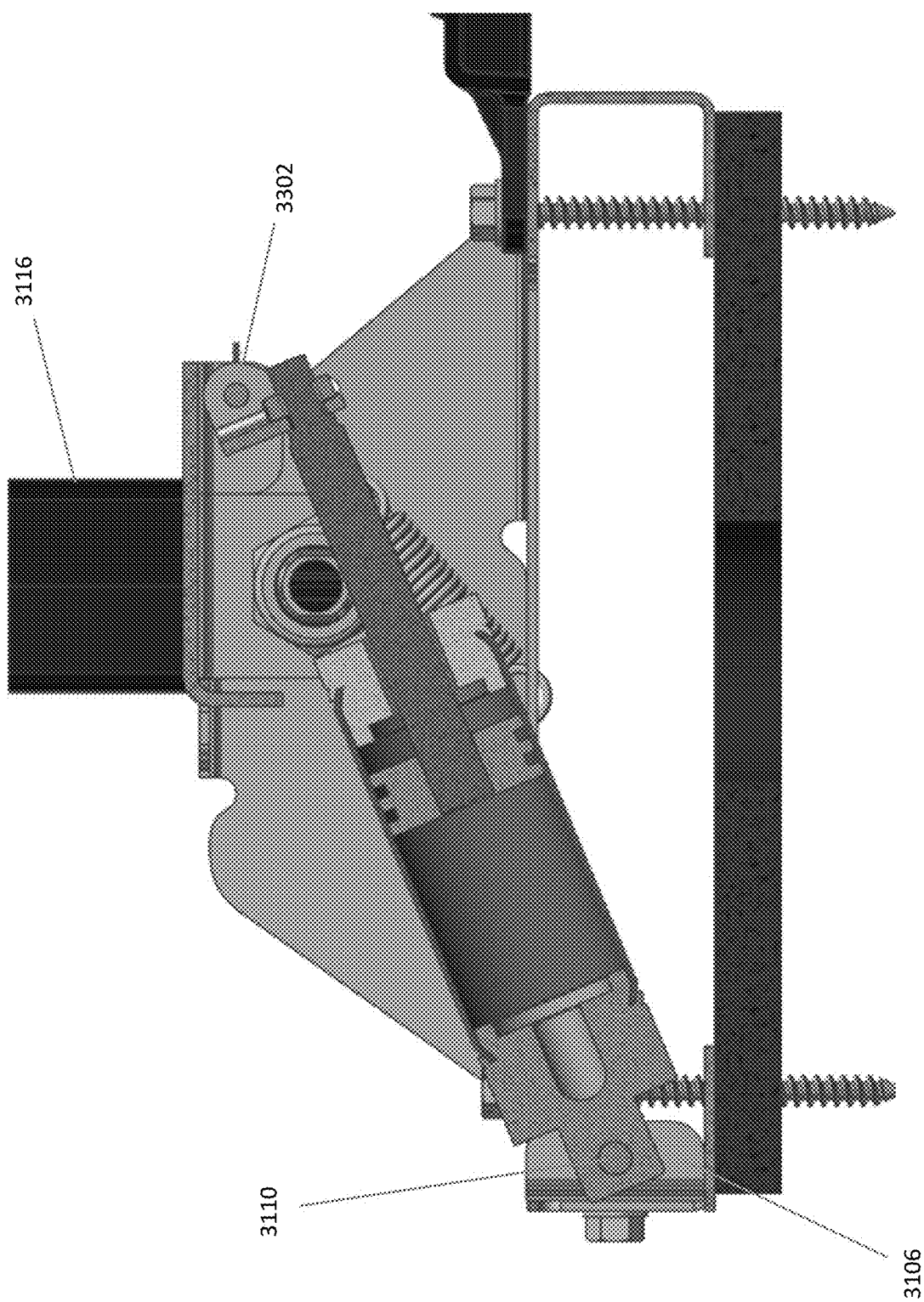

VEHICLE STATUS INDICATOR SYSTEMS WITH ENHANCED ASSEMBLIES, ACTUATOR DEVICES, AND ILLUMINATION FEATURES

CROSS-REFERENCE TO RELATED APPLICATIONS/PRIORITY CLAIMS

The present application claims the priority benefit of U.S. Provisional Patent Application Ser. No. 63/322,769, filed on Mar. 23, 2022, and also claims the priority benefit of U.S. Provisional Patent Application Ser. No. 63/228,408, filed on Aug. 2, 2021. The entirety of both aforementioned patent applications is hereby incorporated by reference into the present application.

FIELD OF THE INVENTION

Various embodiments of the present invention generally relate to systems, processes, devices, and techniques for communicating alerts and events associated with the operation of a vehicle. In particular embodiments, the invention incorporates features useful for enhancing the illumination and visibility aspects and actuation capabilities of a vehicle status indicator sign or system.

INTRODUCTION

Vehicle traffic on highways, streets, and other travel routes can present hazards to cars, buses, bikes, passengers, and pedestrians, among others who use the traffic system. For example, school students boarding and disembarking from buses and similar passenger vehicles are often vulnerable to accidents caused by the surrounding traffic environment. Many buses use conventional movement status indicator systems, stop indicators, and/or visual warning systems to attempt to mitigate the dangers of traffic conditions when passengers enter or exit the bus. One example of a stop indicator useful for school buses is the "Defender Composite Stop indicator" product offered by Safe Fleet (Belton, Missouri).

However, despite these safety measures, accidents can still be caused by vehicle traffic traveling at excessive speed and/or in close proximity to the bus during loading or unloading operations. Accordingly, traffic conditions remain a significant threat to the safety and welfare of bus passengers, especially students on school buses, for example. Therefore, enhanced tools and techniques are needed to signal vehicle conditions in traffic environments surrounding vehicles such as school buses. In addition, technical solutions are needed for communicating alerts and events associated with the operation of such vehicles, especially at crucial times when passengers are entering or exiting the bus.

BRIEF DESCRIPTION OF THE FIGURES

FIG. 11 illustrates an example of a lighting system in which an illumination timing device can be operatively associated with a vehicle status indicator system.

FIGS. 31 through 33 illustrate another example of a vehicle status indicator system comprising a pneumatically actuated base assembly.

DESCRIPTION

Figure 1:
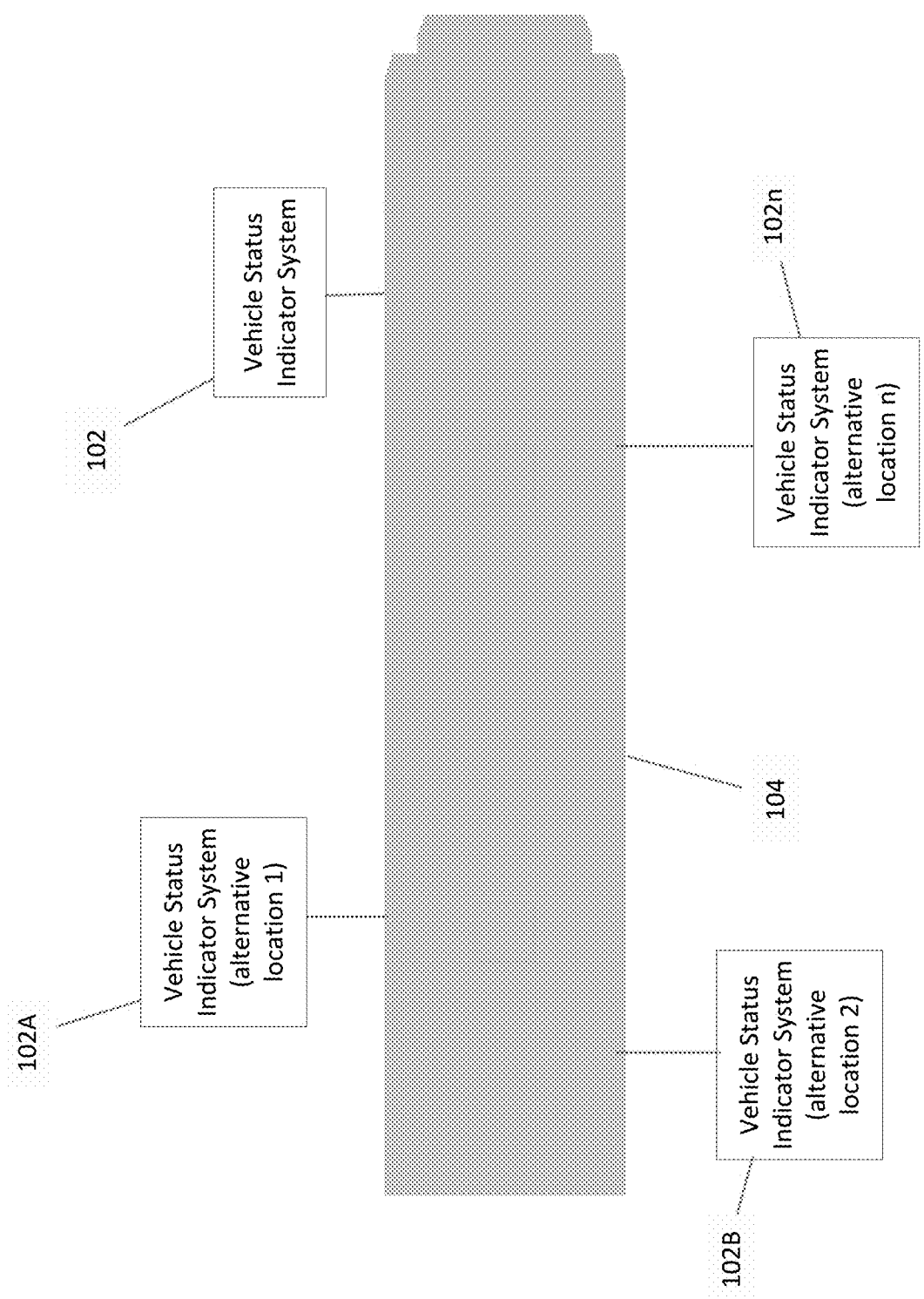
FIGS. 1 through 3 schematically illustrate an overview of one example of an environment in which a vehicle status indicator system structured in accordance with certain embodiments of the invention may be employed.
Figure 2:
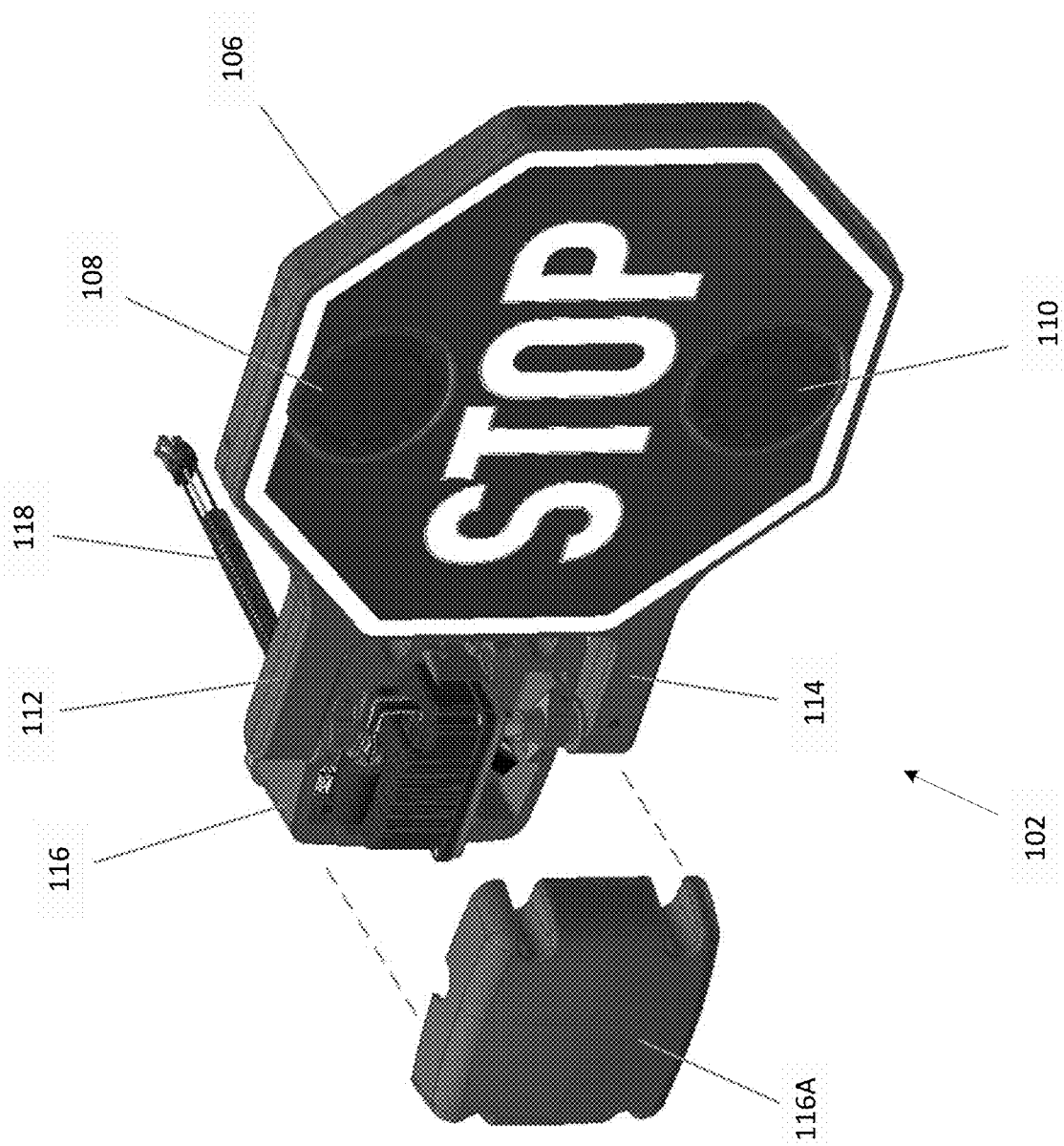
Figure 3:
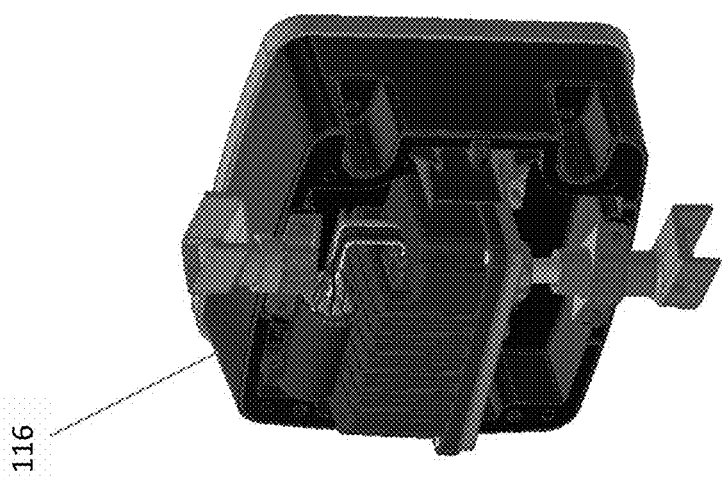

FIGS. 1 through 3 schematically illustrate an overview of one example of an environment in which a vehicle status indicator system 102 structured in accordance with certain embodiments of the invention may be employed. In this example, the system 102 can be configured for operative association and communication with a school bus type vehicle 104. Although the system 102 has been installed in certain location on the vehicle 104 in this example the system 102 can also be alternatively installed in variety of different locations (represented by installation locations 102A, 102B, 102*n*). Depending on the type of vehicle 104 and the application for the vehicle 104, one or more such systems 102 may be installed and employed at different locations on the vehicle 104.

In various embodiments, the status indicator system 102 may include a sign component 106 comprising two light elements 108, 110. The sign component 106 also includes integrally incorporated arms 112, 114 which mechanically couple to a drive unit 116 (shown with cover 116A removed for clarity of illustration). In certain embodiments, the drive unit 116 can be electrically and communicatively coupled to other systems of the vehicle 104 through cable connection 118. In this manner, electrical power and signals can be communicated from these other systems of the vehicle 104 to the system 102, such as when it is desired to activate or deactivate the sign component 106, for example. The drive unit 116 may also be configured with a motor and operatively associated gears, which can function to extend or retract the sign component 106 (i.e., through the coupling of the drive unit 116 to the arms 112, 114 of the sign component 106) away from or toward the vehicle 104 during boarding or offloading passengers to/from the vehicle 104, for example. In other embodiments, the system 102 may be configured for operation with many other kinds of vehicles 104 such as ambulances, fire trucks, construction vehicles, passenger trains, watercraft, aircraft, and other vehicles 104 capable of employing a status indicator system 102, or which might otherwise benefit from use of the systems, tools, and techniques described herein.

Figure 4A:
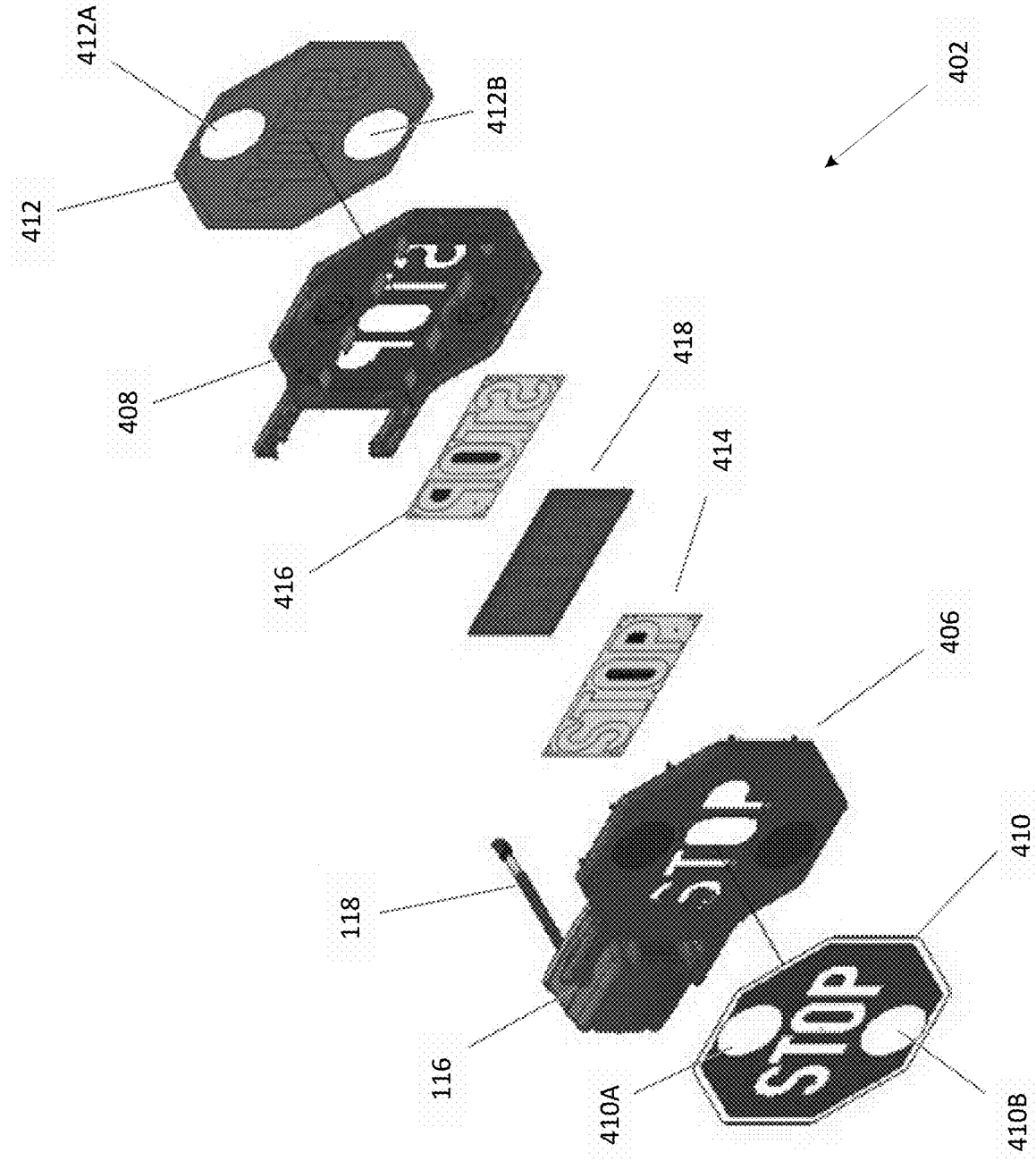
FIGS. 4A and 4B illustrate one example of a vehicle status indicator system structured in accordance with various embodiments of the invention.
Figure 4B:
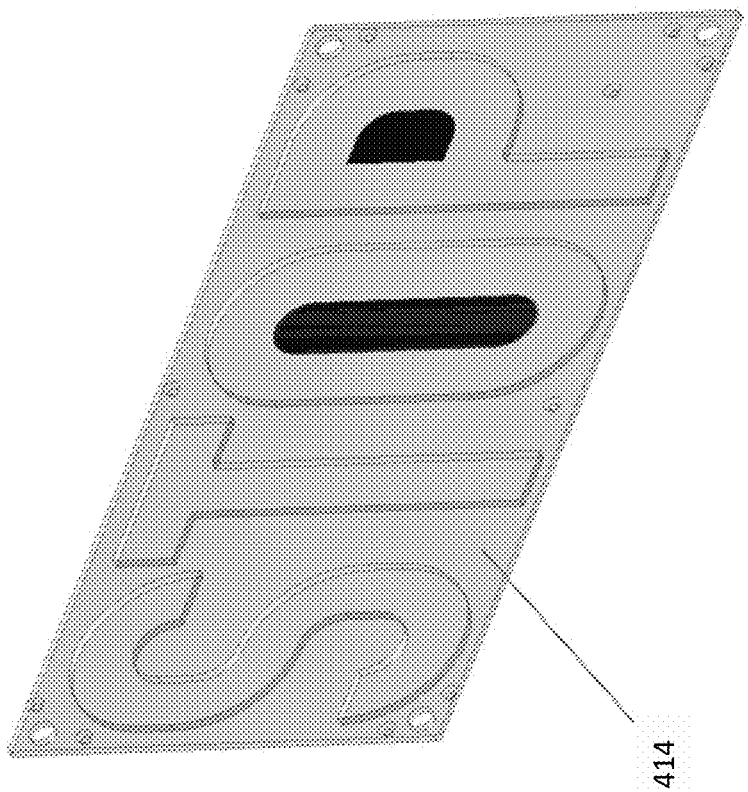

FIGS. 4A and 4B illustrate one example of a vehicle status indicator system 402 structured in accordance with various embodiments of the invention. In this example, a sign body 404 comprises two blades 406, 408 comprising material removed in the shape of a symbol, word, or other message which the system 402 is configured to signal or communicate to others. As shown in this example, the outlines of multiple letters in the word "STOP" have been removed from the material (e.g., plastic or metal) which comprises the blades 406, 408. Decals 410, 412 can be structured to be applied to the blades 406, 408 (respectively as shown), with material at the light holes 410A, 410B, 412A, 412B of each decal 410, 412 removed. In certain embodiments, backstops 414, 416 can be provided with raised letters pressed therein, for example, which directly correspond with the letter outlines of the word, letters, symbol, or other message represented by the decals 410, 412 (respectively as shown). The backstops 414, 416 may be comprised of a clear plastic or semi-clear plastic material.

In various embodiments, a light generation component 418 may be provided for providing backlight to the letters, words, symbols, or other messages to be communicated by the vehicle status indicator system 402. In this example, the light generation component 418 includes multiple light-emitting diodes (LEDs) positioned on both sides of an integrated circuit board. The various LEDs are formed in a pattern on each side of the circuit board which corresponds directly and on a one-to-one basis with each of the raised letters "STOP" impressed into the backstops 414, 416. In operation, it can be seen that illumination of these LEDs provides a backlighting illumination source for the letters. In various embodiments, masking components may be applied to one or both backstops 414, 416 to promote achieving optimal letter or symbol outlines.

Figure 5:
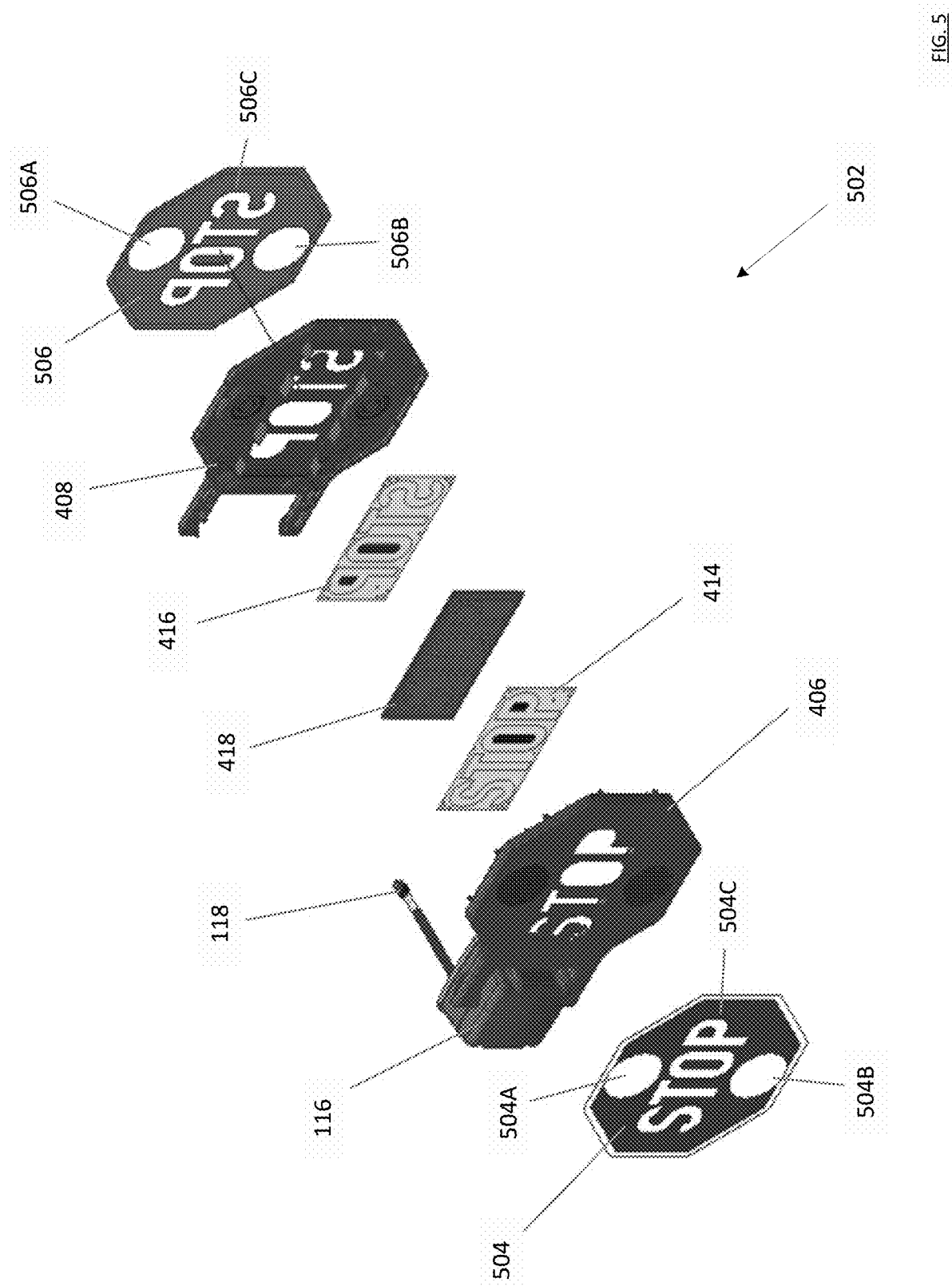
FIG. 5 illustrates another example of a vehicle status indicator system structured in accordance with various embodiments of the invention.

FIG. 5 illustrates another example of a vehicle status indicator system 502 structured in accordance with various embodiments of the invention. In this example, material for the decals 504, 506 has been removed for the light holes (504A-B, 506A-B, respectively) and for the message letter outlines (504C, 506C, respectively). In this manner, light transmitted through the letters or other message displayed by the system 502 can be altered, perhaps for different vehicles 104 types, applications or uses, or vehicle operating environments.

Figure 6:
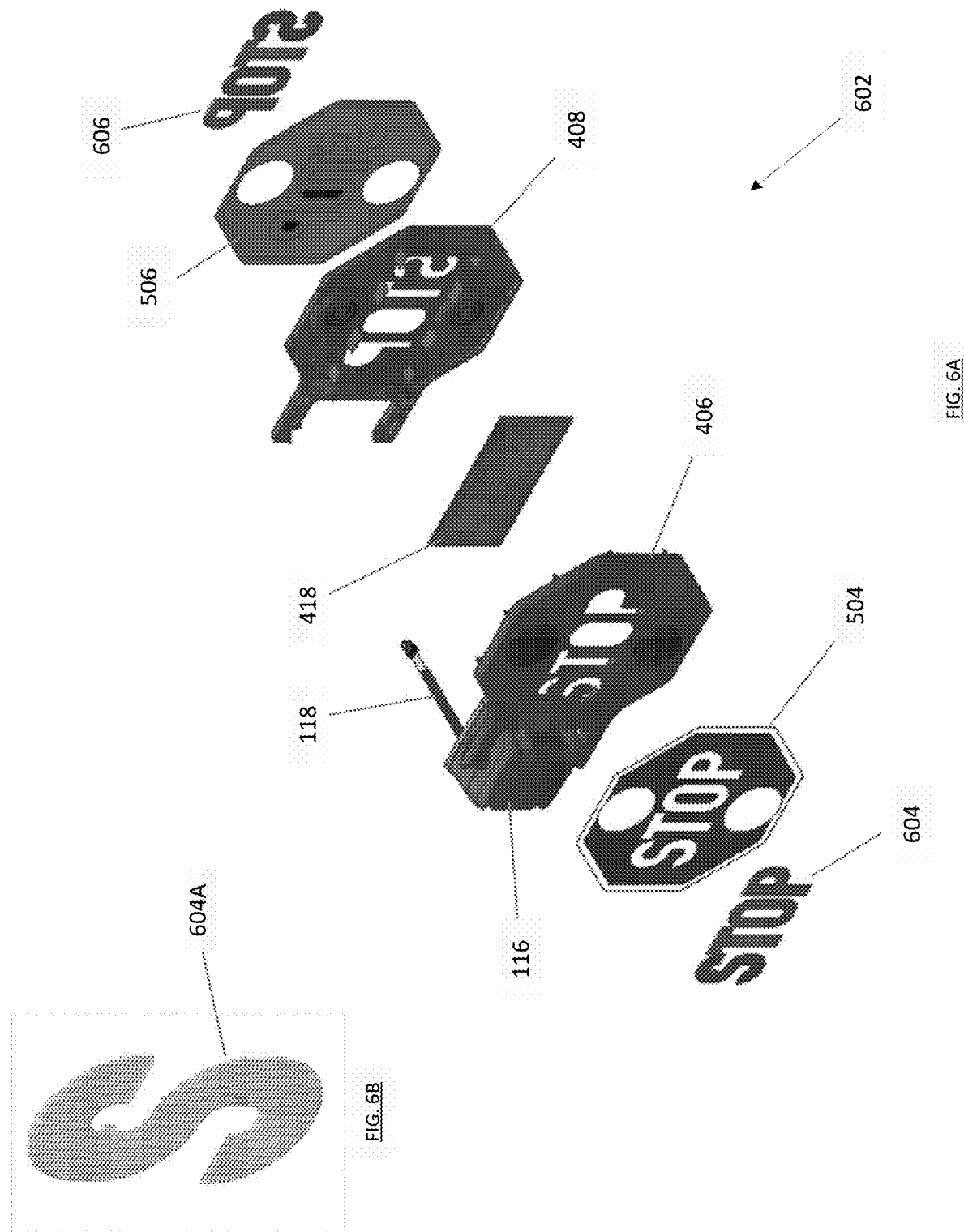
FIGS. 6A and 6B illustrate another example of a vehicle status indicator system structured in accordance with various embodiments of the invention.

FIGS. 6A and 6B illustrate another example of a vehicle status indicator system 602 structured in accordance with various embodiments of the invention. In this variation, groups of letters 604, 606 comprising the "STOP" message are provided as separate components. One example of a plastic letter 604A is shown in FIG. 6B. Those skilled in the art will appreciate that use of such groups of letters 604, 606 in this system 602 can be used to alter light transmitted through messages displayed, perhaps for different vehicles 104 types, applications or uses, or vehicle operating environments.

Figure 7:
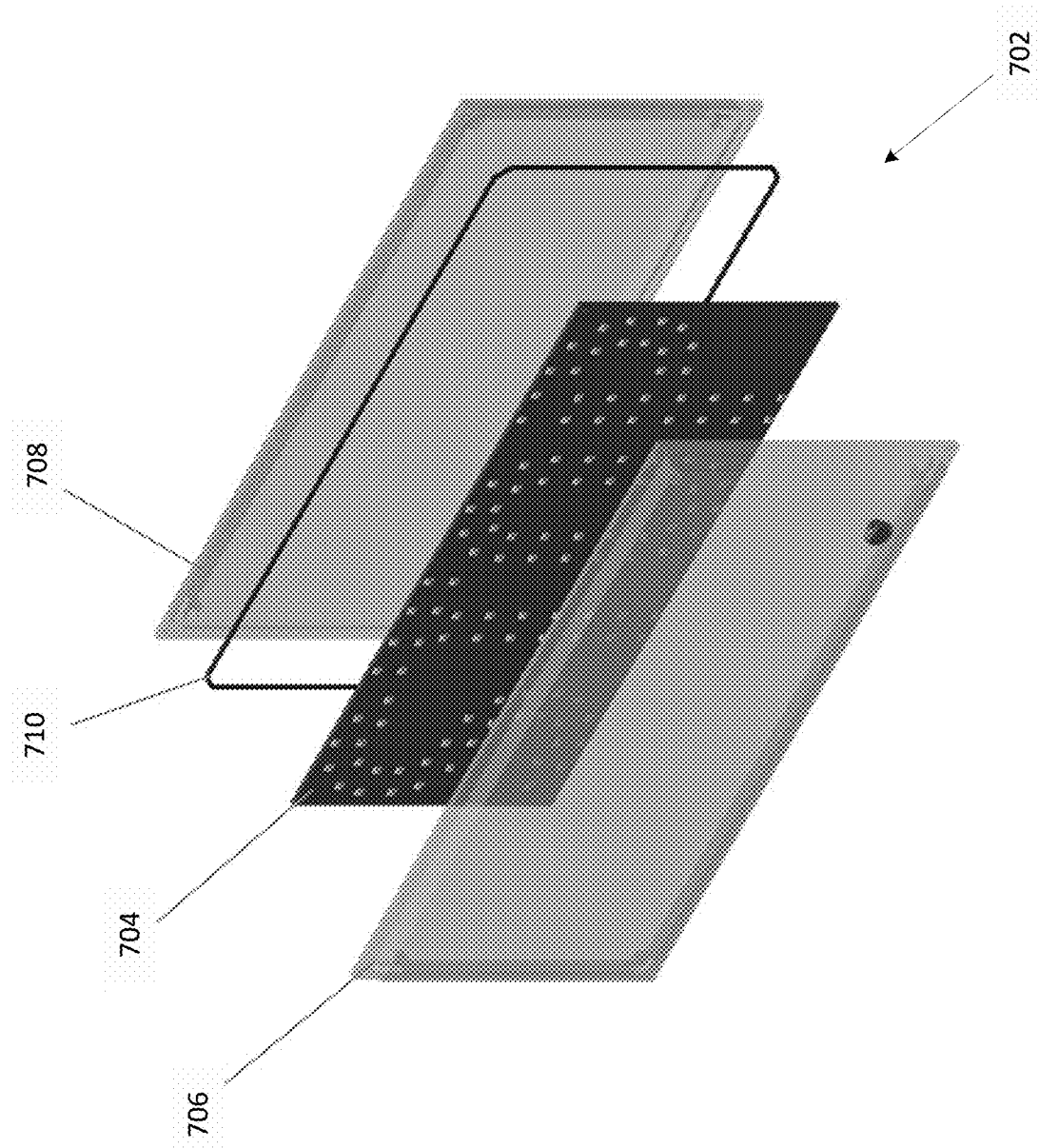
FIG. 7 includes an example of a light generation component which can be structured and employed in accordance with various embodiments of the invention.

FIG. 7 includes an example of a light generation component 702 which can be structured and employed in accordance with various embodiments of the invention. In this example, the light generation component 702 includes a double-sided circuit board 704 with an integrated LED driver. The circuit board 704 contains multiple light-emitting diodes (LEDs) positioned on both sides of the circuit board 704. As shown, the various LEDs are formed in a pattern on each side of the circuit board which corresponds directly and on a one-to-one basis with each of the raised letters of the "STOP" message to be displayed. In operation, it can be seen that illumination of these LEDs provides a backlighting illumination source for the different letters of the message. In certain embodiments, the circuit board 704 may be encased by front cover 706 and back cover 708, which can be comprised of a clear or semi-clear plastic materials. In combination, the covers provide an encasement for the circuit board 704, and a gasket 710 can be employed to resist moisture, dust, or other contaminants from entering the light generation component 702.

Figure 8:
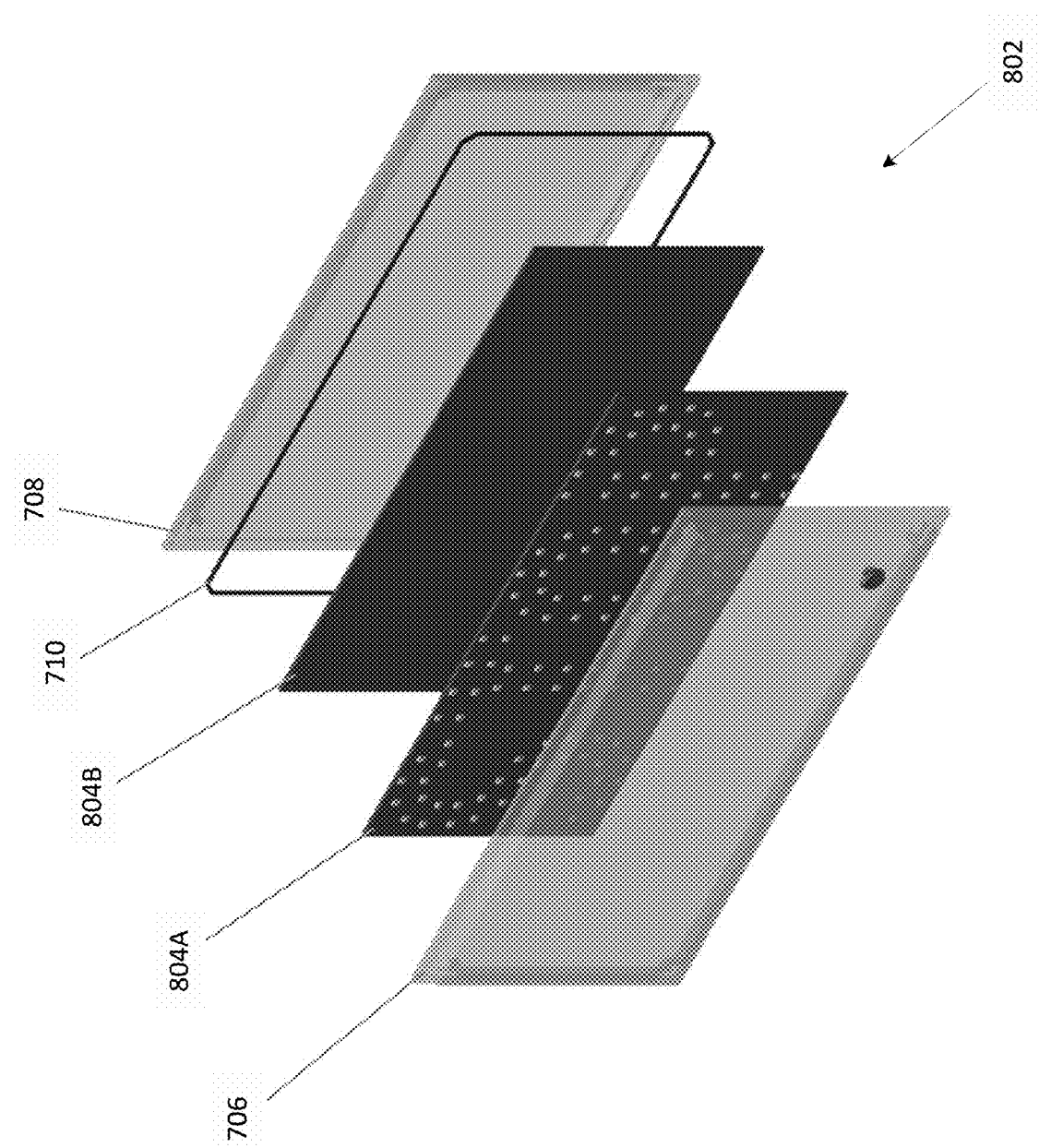
FIG. 8 includes another example of a light generation component which can be structured and employed in accordance with various embodiments of the invention.

FIG. 8 includes another example of a light generation component 802 which can be structured and employed in accordance with various embodiments of the invention. In this example, the light generation component 802 includes a two-part circuit board 804 with front portion 804A and back portion 804B and with an integrated LED driver. The circuit board 704 contains multiple LEDs positioned on each portion 804A, 804B of the circuit board 804. As shown, the various LEDs are formed in a pattern on each portion 804A, 804B of the circuit board 804, in which each portion of the pattern corresponds directly and on a one-to-one basis with each of the raised letters of the "STOP" message to be displayed. In operation, it can be seen that illumination of these LEDs provides a backlighting illumination source for the different letters of the message.

Figure 9:
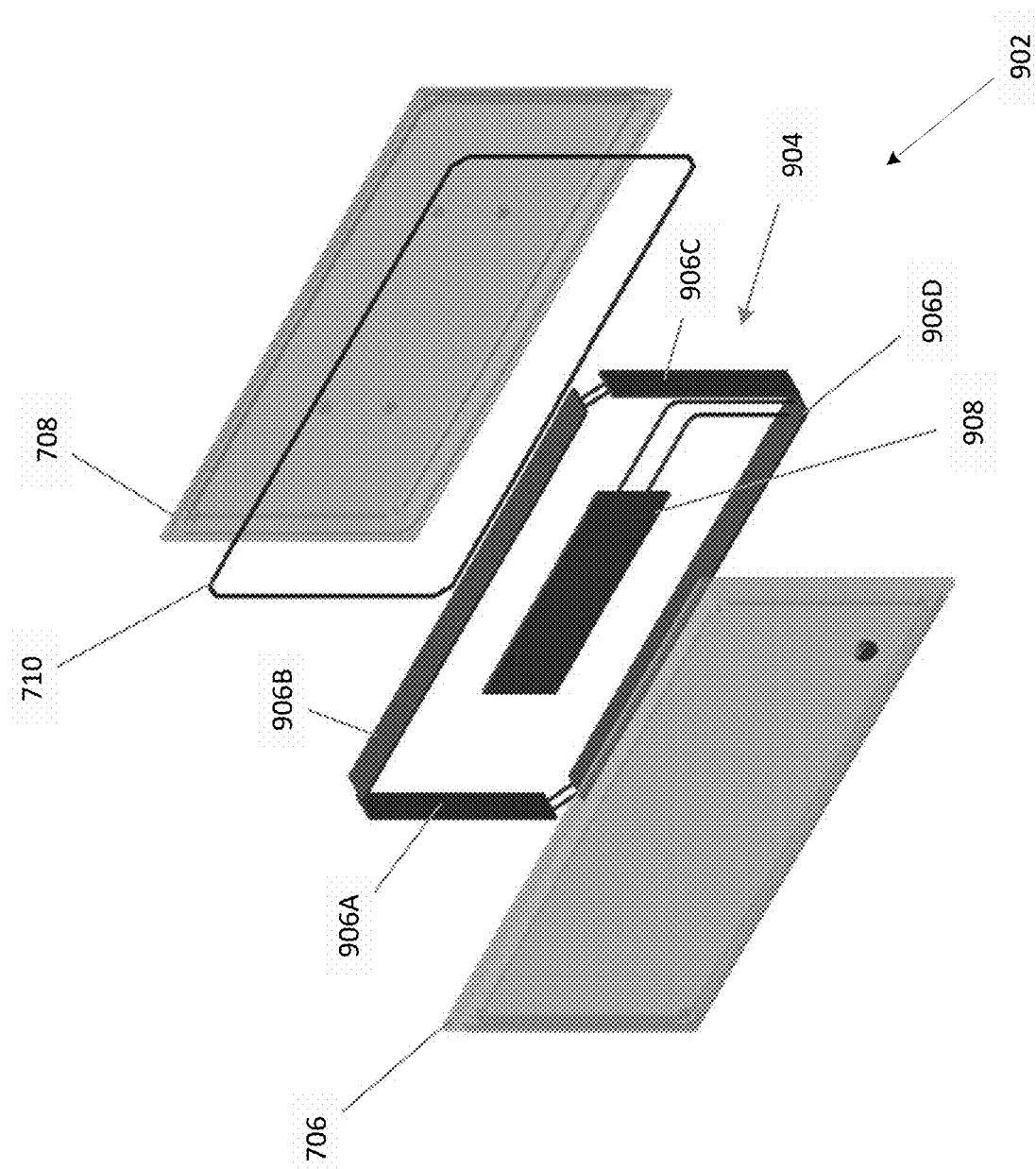
FIG. 9 includes another example of a light generation component which can be structured and employed in accordance with various embodiments of the invention.

FIG. 9 includes another example of a light generation component 902 which can be structured and employed in accordance with various embodiments of the invention. In this example, the light generation component 902 includes a series of peripherally mounted LEDs positioned at the edges of electrically connected sub-portions 906A-906D of a circuit board 904. The LEDs can be positioned so that when the circuit board 904 is activated for illumination, light can be transmitted from the LEDs generally inwardly toward a center internal portion of the circuit board 904. An LED driver 908 can be provided to direct the action and illumination of the LEDs installed within the circuit board 904.

Figure 10A:
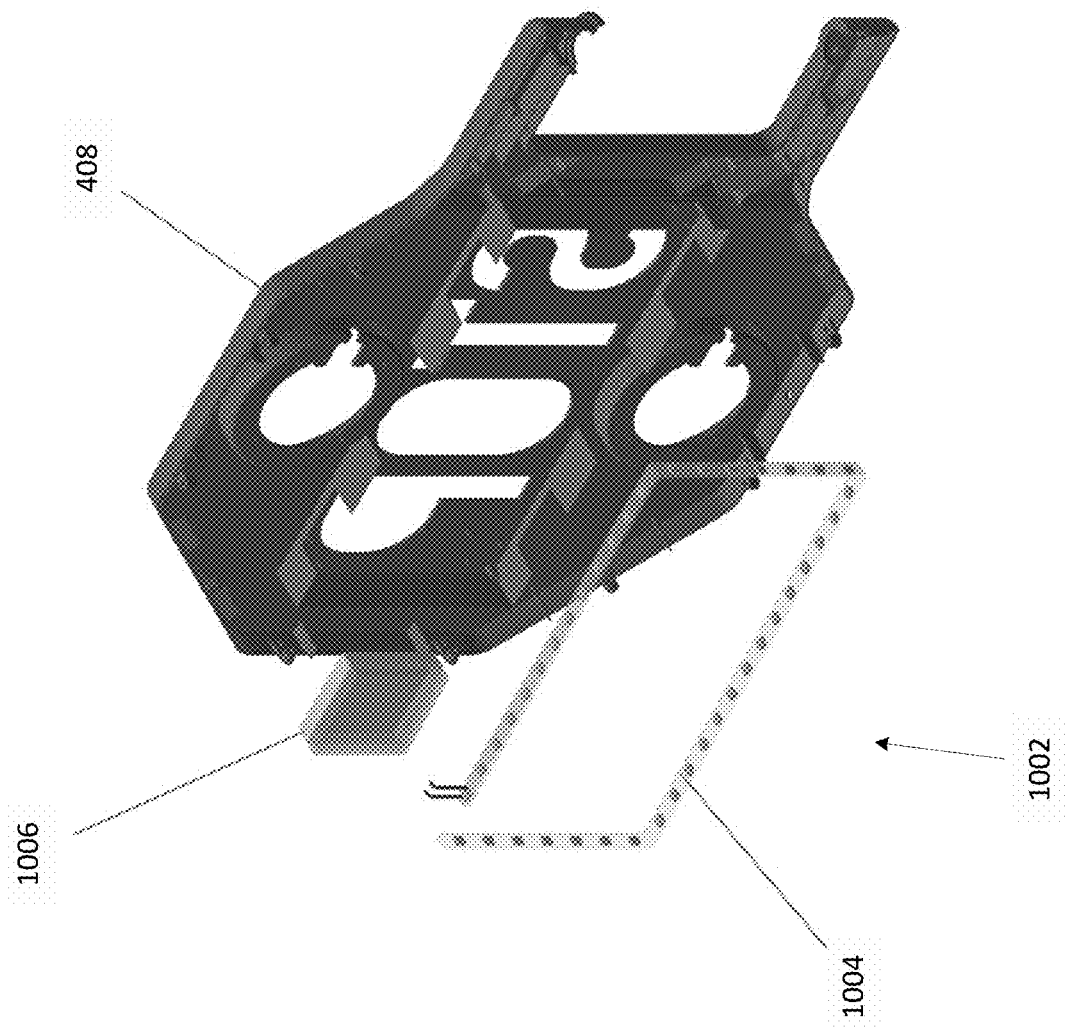
FIGS. 10A and 10B illustrate another example of a light generation component which can be structured and employed in accordance with various embodiments of the invention.
Figure 10B:
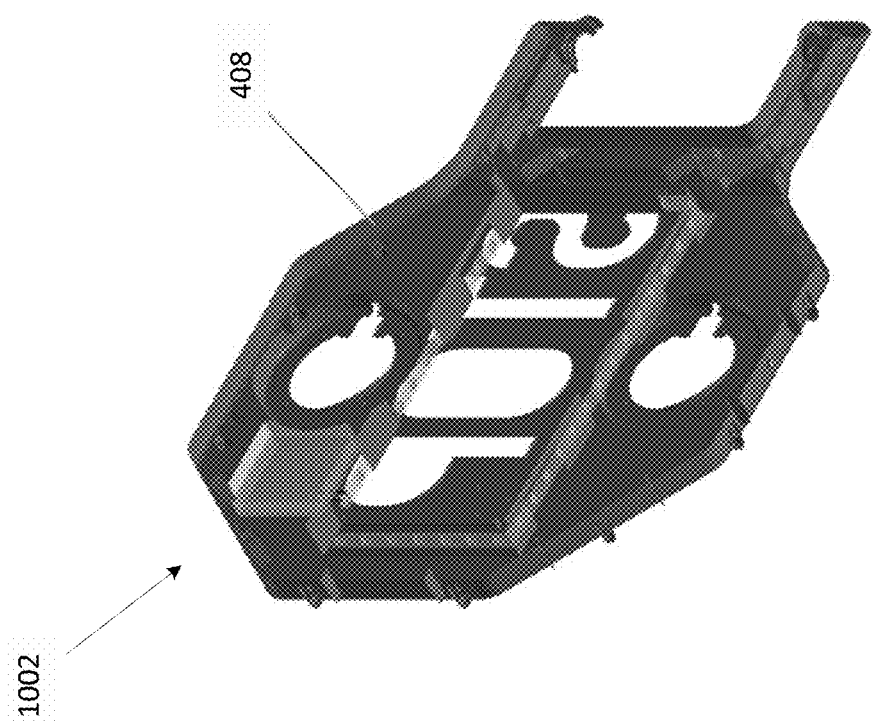

FIGS. 10A and 10B illustrate another example of a light generation component 1002 which can be structured and employed in accordance with various embodiments of the invention. In this example, a light strip 1004 includes a series of LEDs positioned on the strip 1004. The light strip 1004 can be electrically connected to an LED driver 1006 which can be provided to direct the action and illumination of the LEDs installed within the strip 1004. As shown in FIG. 10B, the light generation component 1002 can be installed in the internal structure of the blade 408, for example.

FIG. 11 illustrates an example of a lighting system in which an illumination timing device 1102 can be operatively associated with the vehicle status indicator system 102. In the examples shown, the device 1102 can be programmed to light different aspects of a stop sign 1104 comprising an upper light element 1106, a lower light element 1108, and main lighting element 1110 comprising an outline of multiple letters forming a "STOP" representation. FIG. 11 shows examples of different modes of illumination 1112A, 1112B, 1112C, 1112D for the stop sign 1104. For example, the device 1102 may be programmed to illuminate or activate the upper light element 1106 of the stop sign 1104 alternately on/off with respect to activation of the lower light element 1108. Similarly, the main element 1110 may be alternatively activated on/off and timed by the device 1102 in connection with activation of the light elements 1106, 1108, to yield different illumination effects. In one embodiment, the main element 1110 may be activated or remain illuminated during the entire duty cycle of the illumination action of the stop sign 1104, while the device 1102 directs the lighting elements 1106, 1108 to alternately activate on/off at predetermined frequency. In various embodiments, the timing device 1102 can be embodied as a microcontroller, processor, or hardwired circuit (e.g., a 555 timer circuit).

Figure 12A:
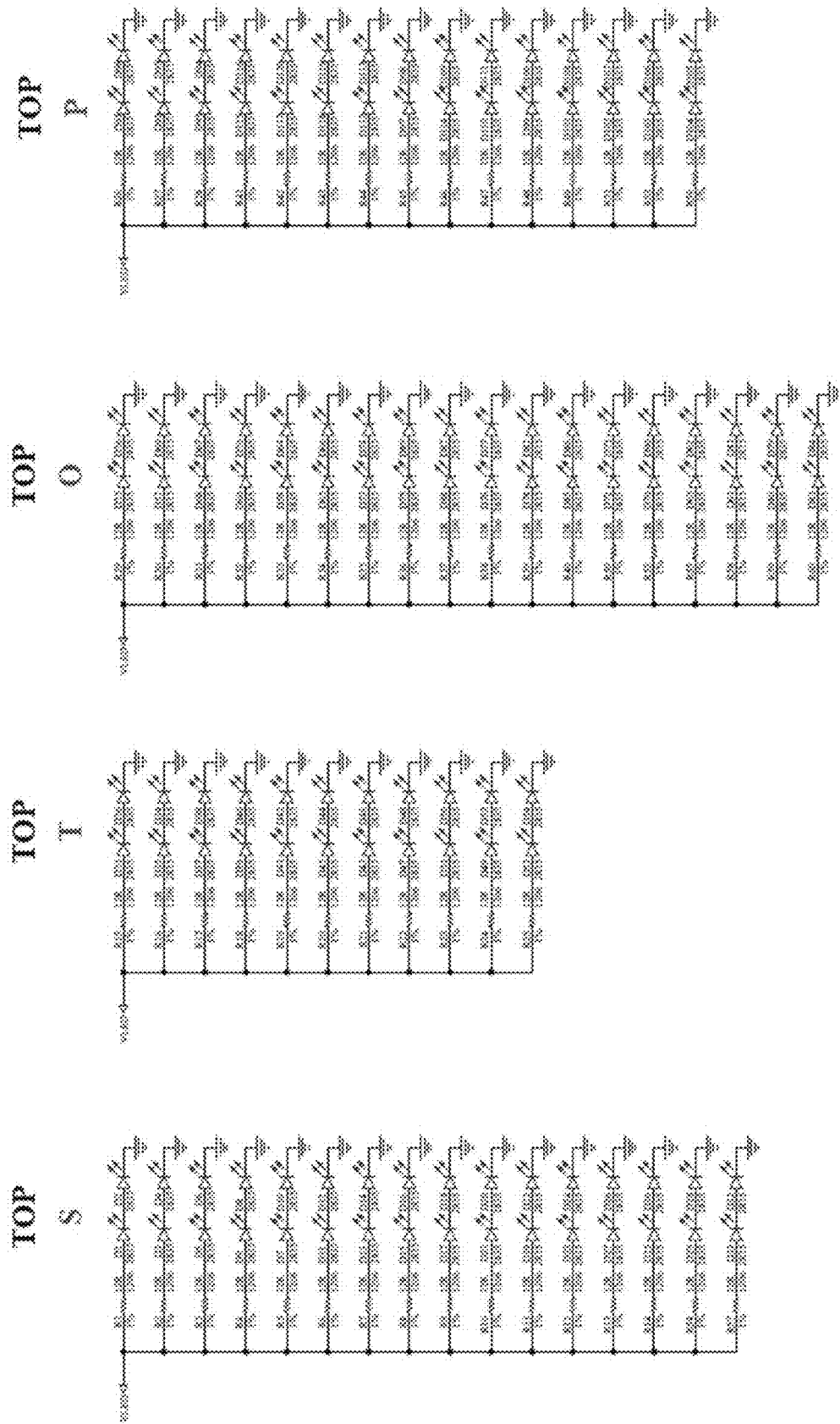
FIGS. 12A, 12B, and 13 provide examples of circuit diagrams which can be implemented by an illumination timing device.
Figure 12B:
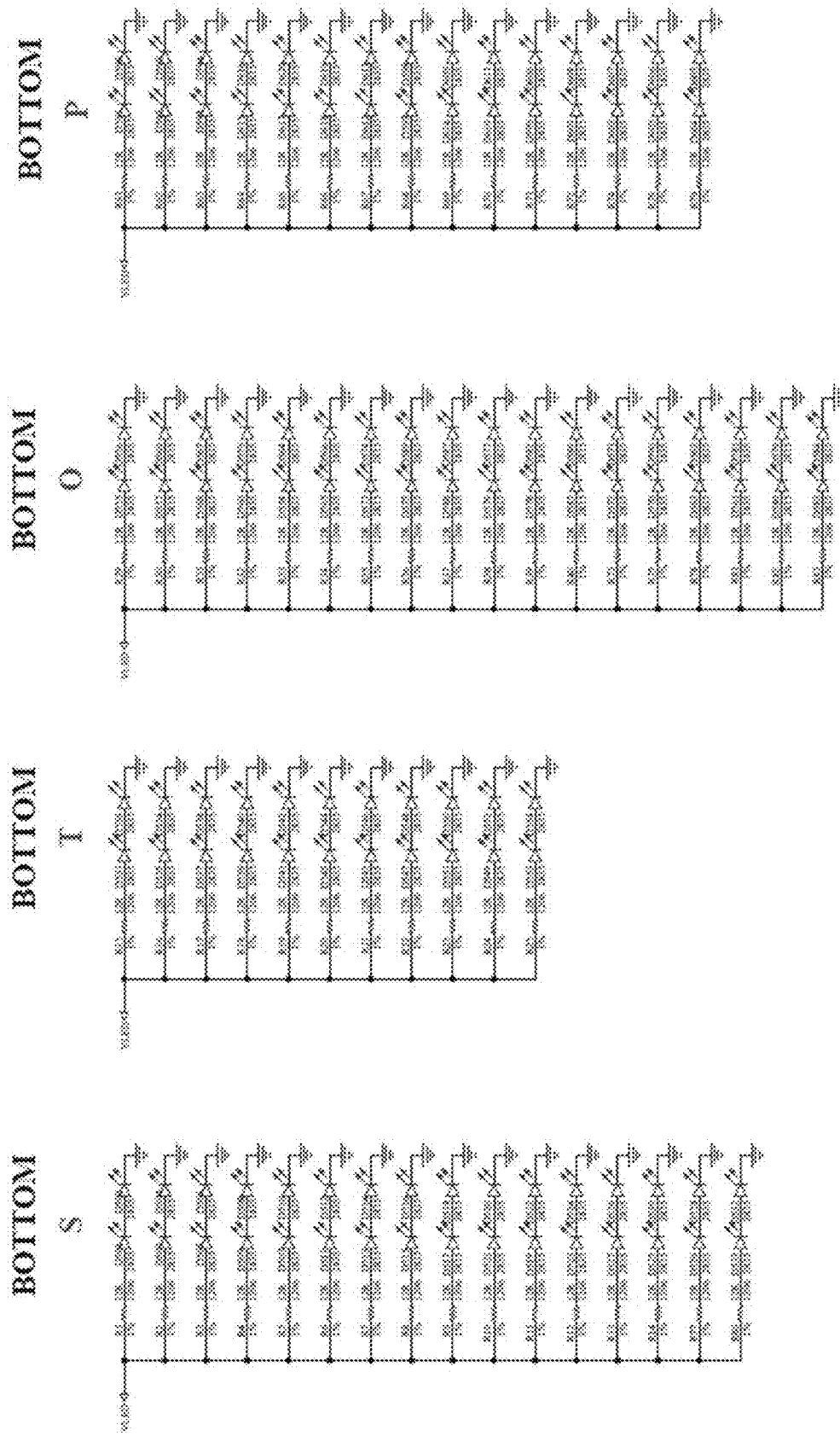
Figure 13:
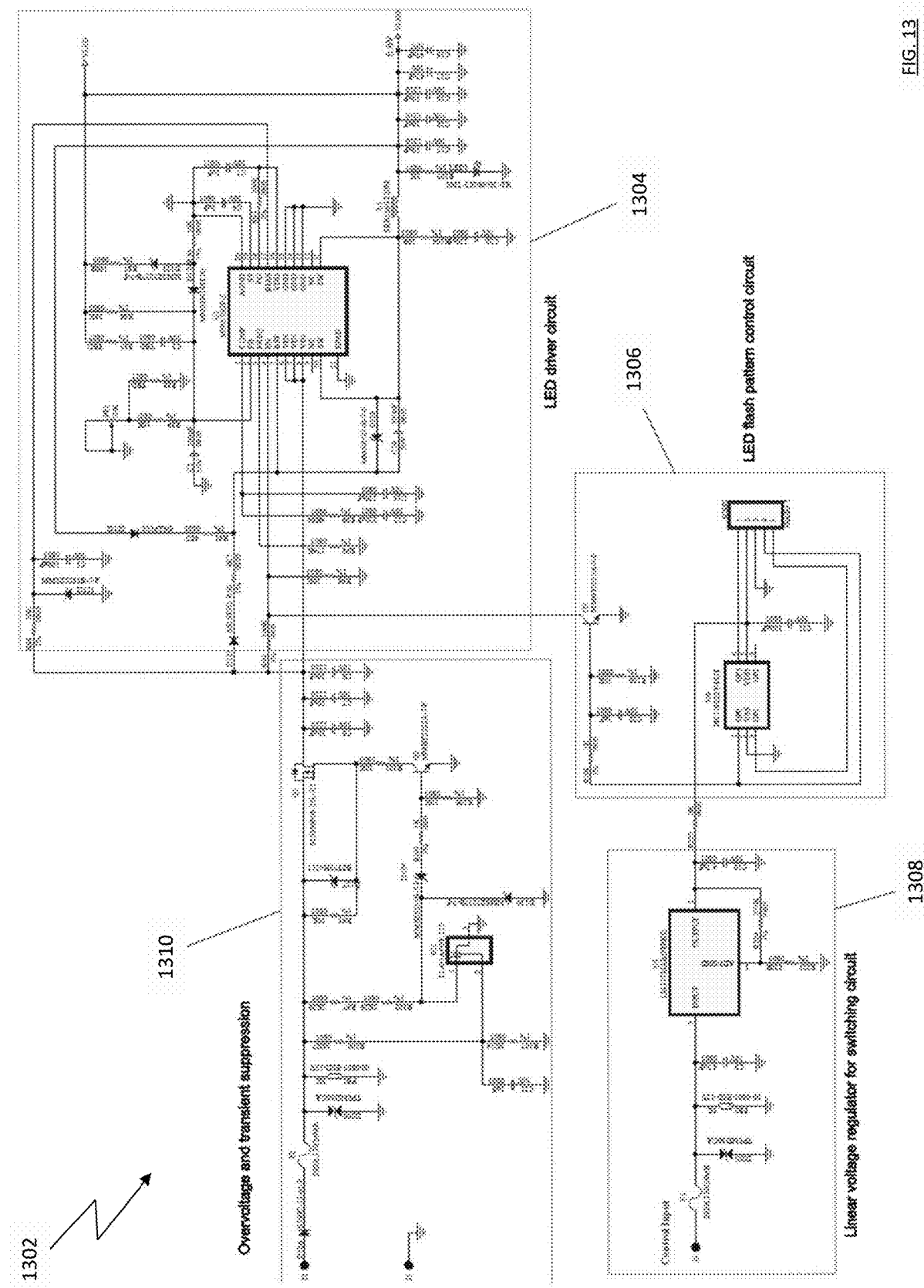
Figure 14:
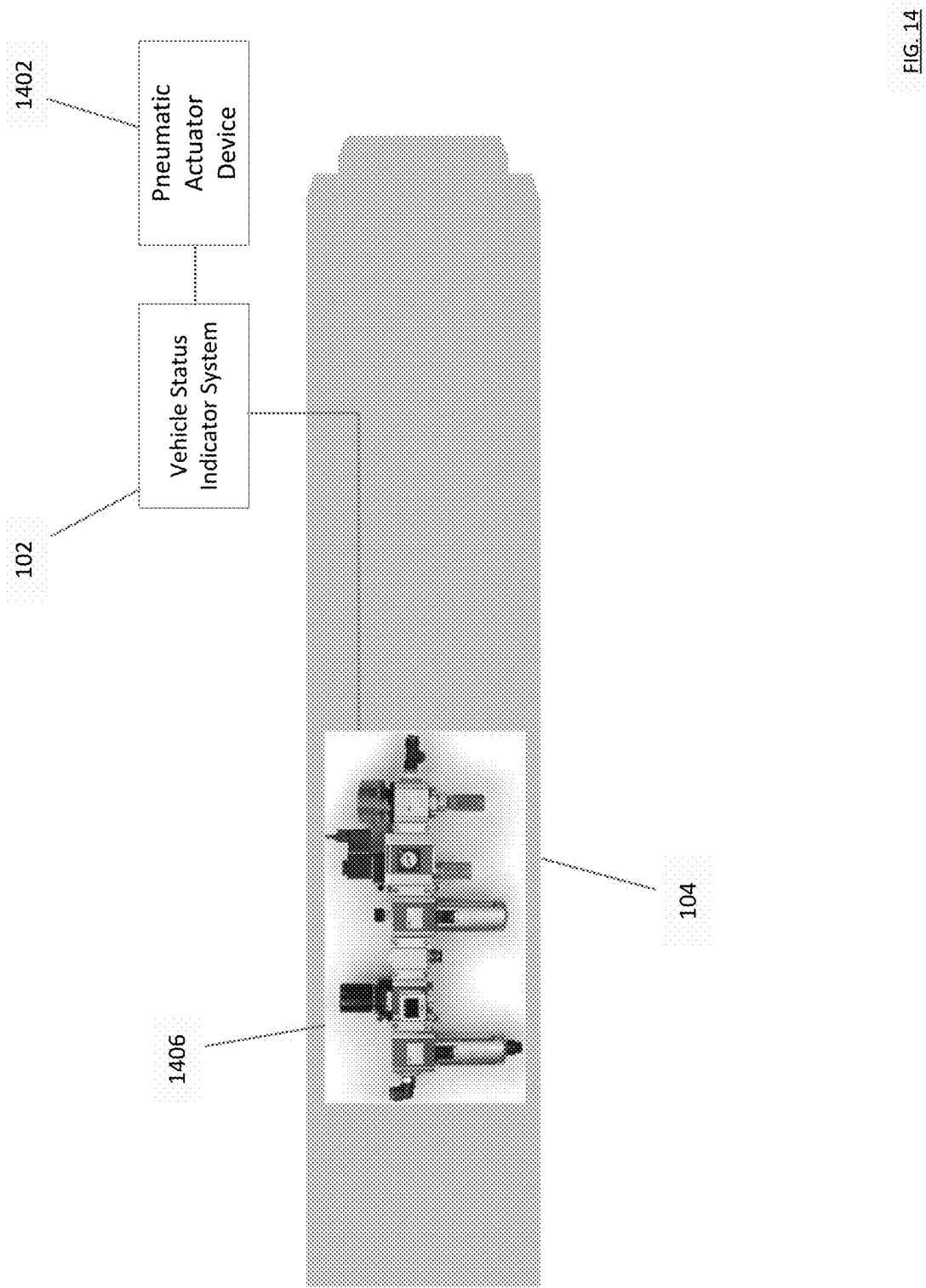
FIGS. 14 through 21 illustrate different aspects of one example of a pneumatically powered actuator device which can be used to extend and retract a stop sign component of a status indicator assembly of a vehicle status indicator system.
Figure 15:
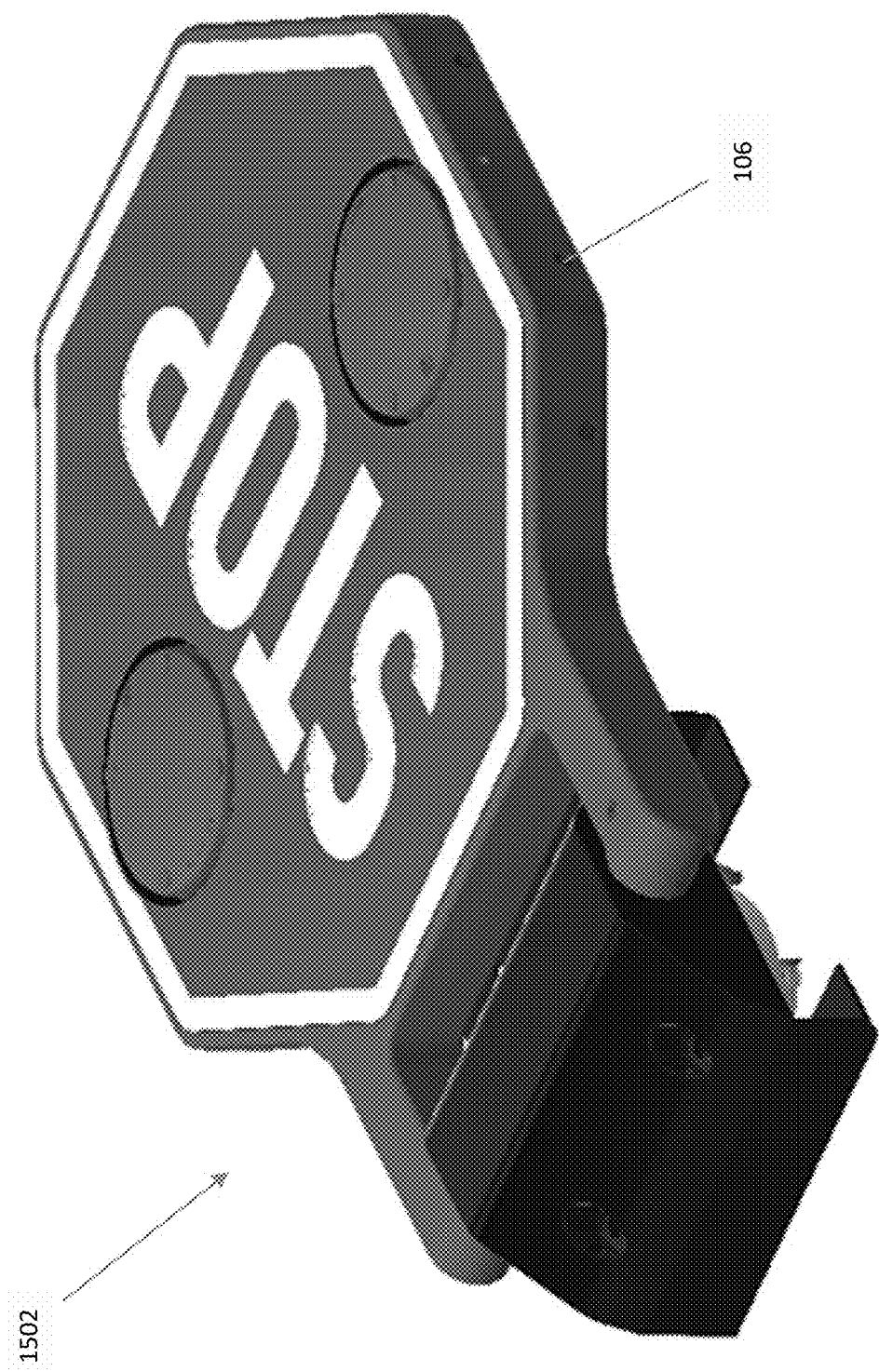
Figure 16:
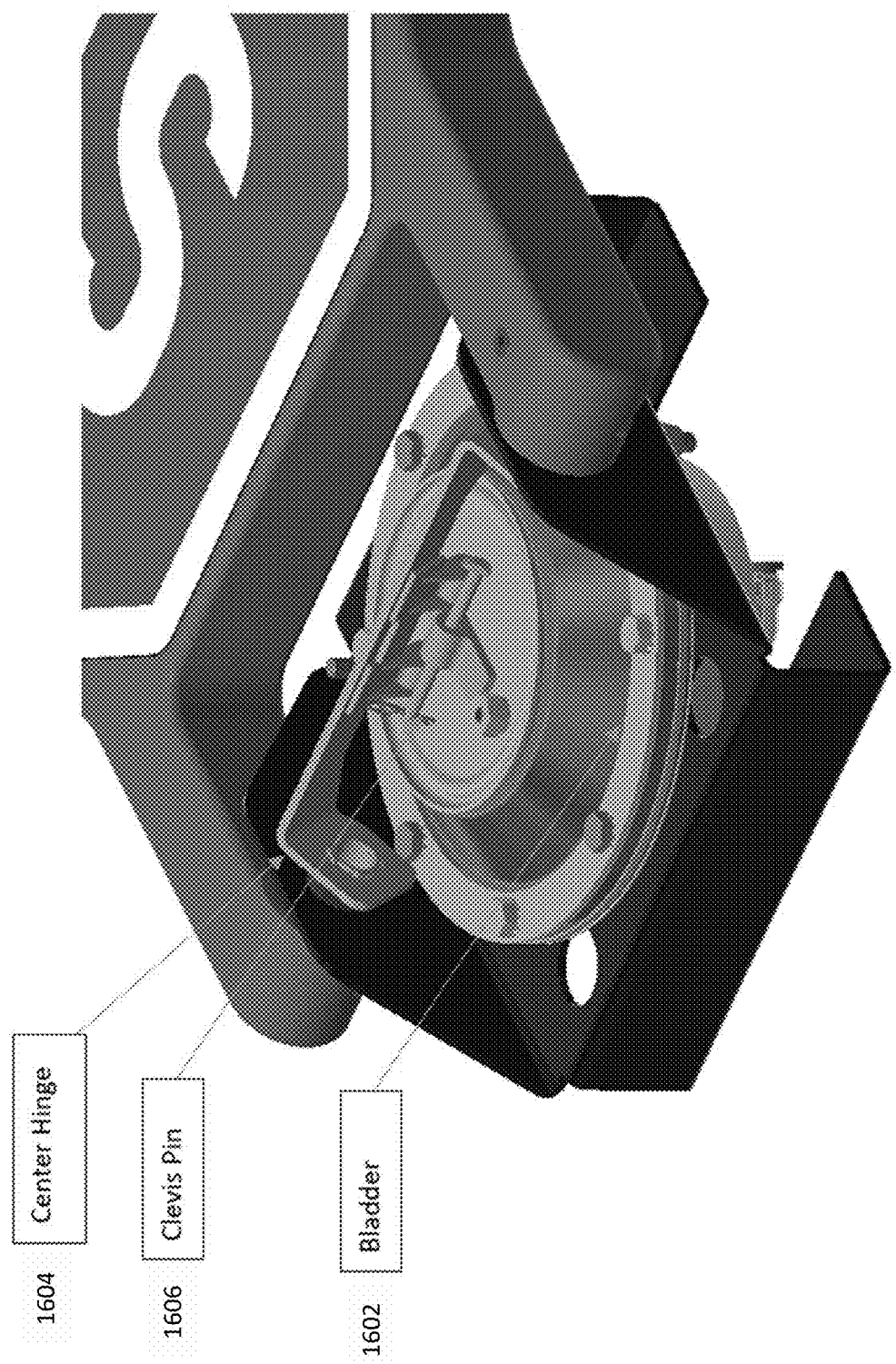
Figure 17:
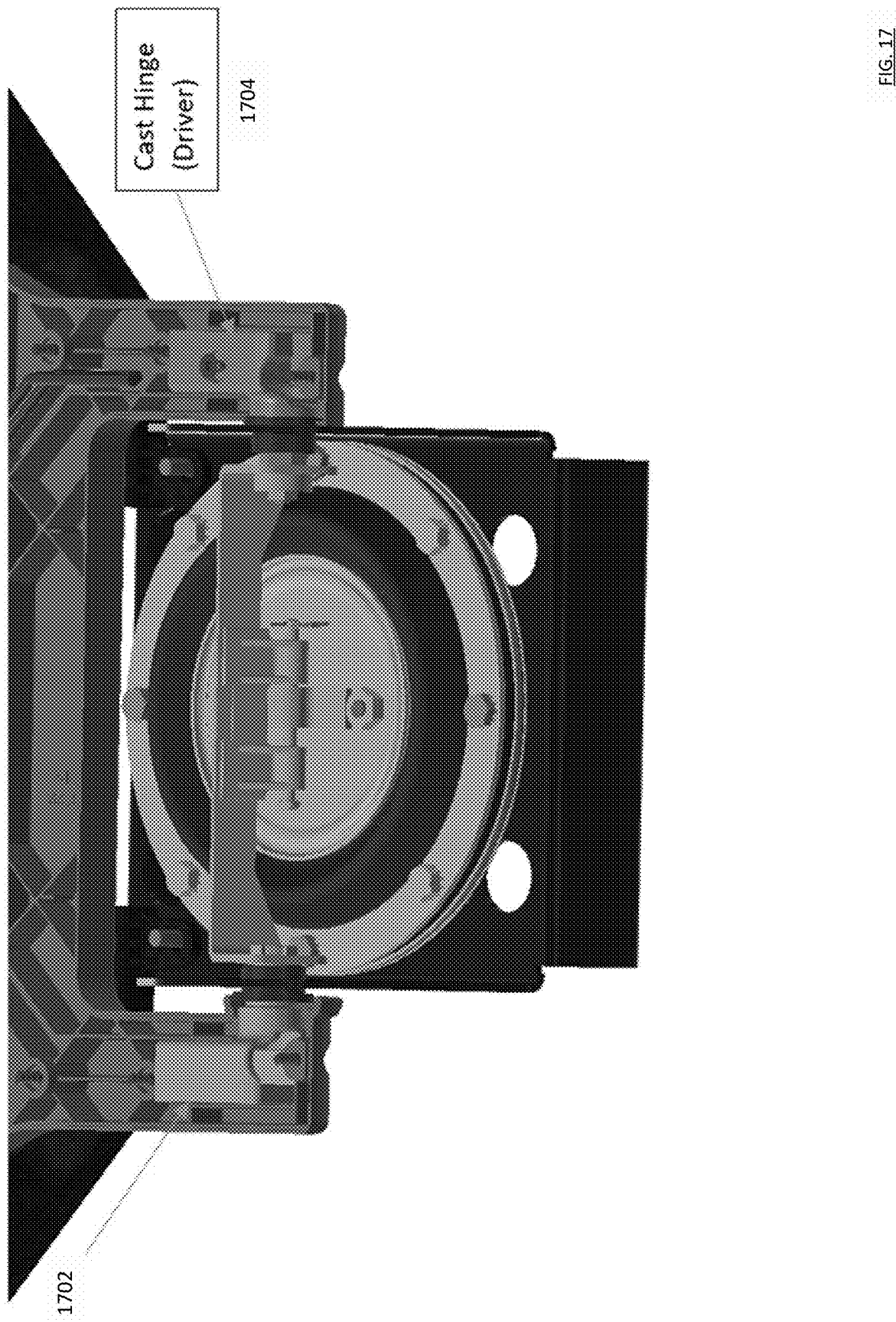
Figure 18:
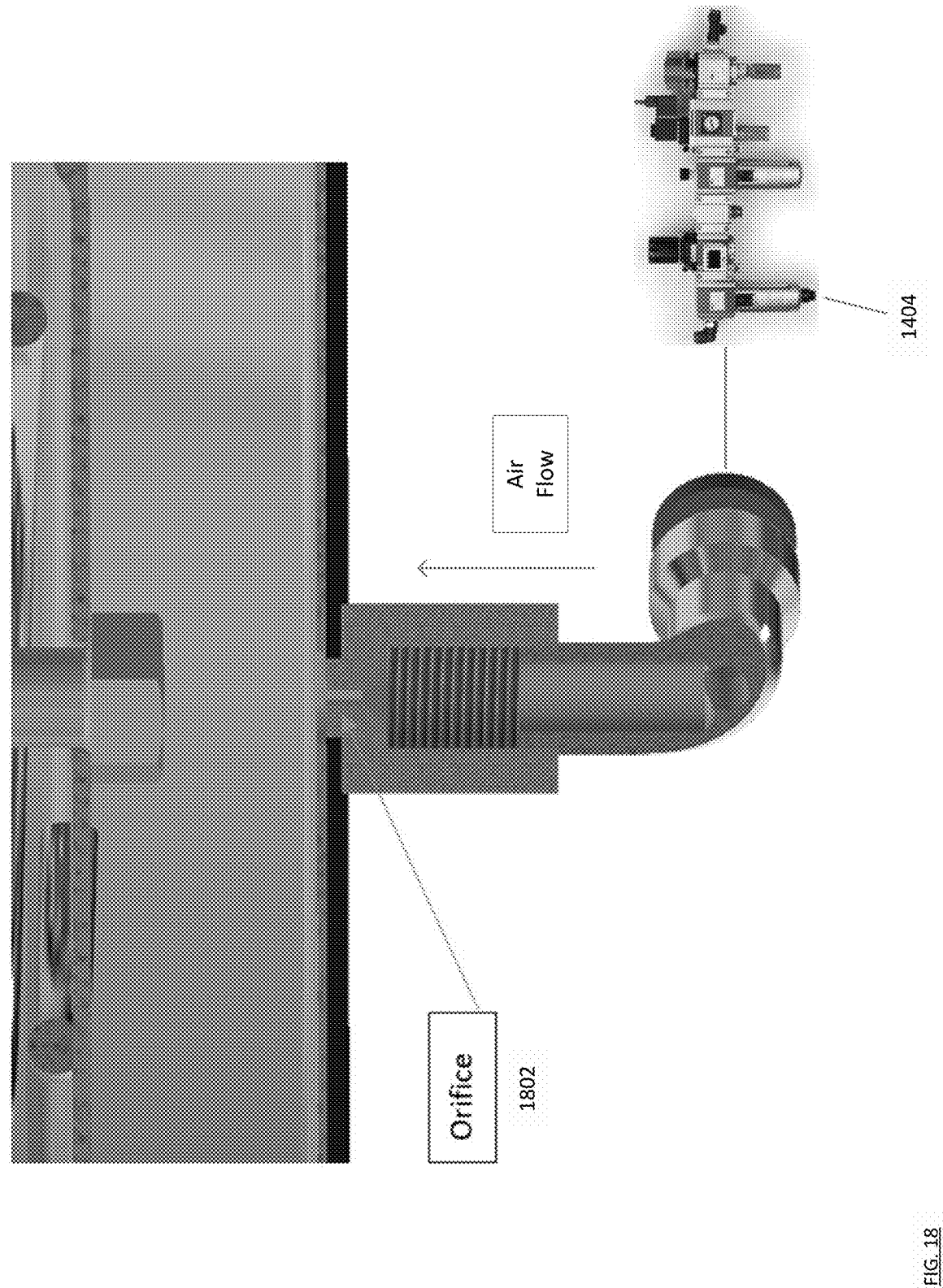
Figure 19:
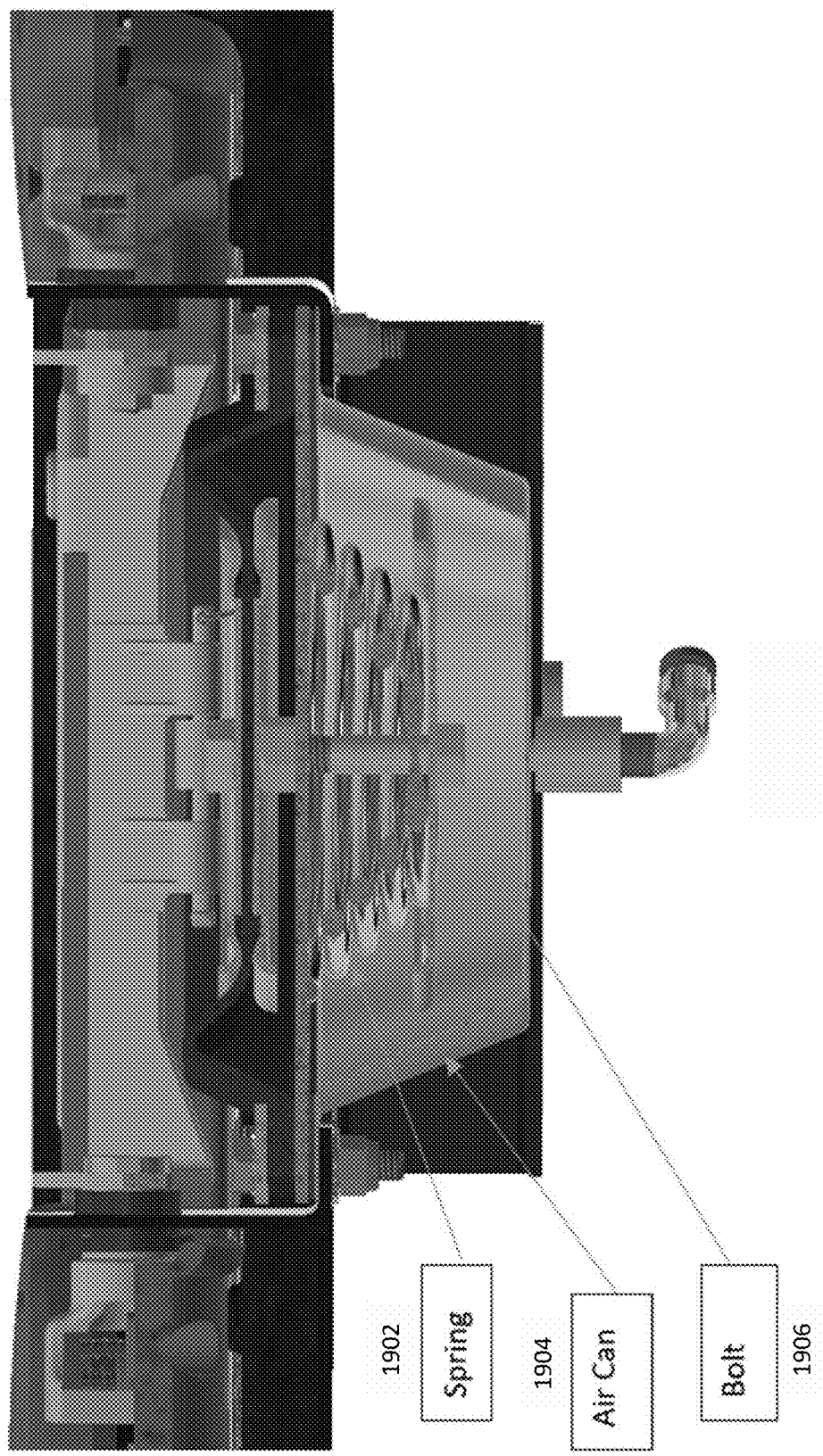

FIGS. 12A, 12B, and 13 provide examples of circuit diagrams which can be embodied by the device 1102 in connection with use of a computer-implemented processor. FIGS. 12A and 12B include examples of LED circuits for illuminating the various letters in a "STOP" representation, for both "top" letters and "bottom" letters of the representation. FIG. 13 illustrates an example of an illumination timing circuit 1302, which includes an LED driver circuit 1304 for activating and deactivating power to various LED's associated with the letters in a sign representation, for example. An LED flash pattern control circuit 1306 can be configured to control the frequency, sequencing, or duration/duty cycle for illumination or deactivation of various LEDs. The LED flash pattern control circuit may function in connection with a linear voltage regulator circuit 1308, as shown. An overvoltage and transient suppression circuit 1310 can be provided to manage voltage levels and transient phenomena which may arise during operation of the timing circuit 1302.

FIGS. 14 through 21 illustrate different aspects of a pneumatically powered actuator device 1402 which can be used to actuate the extension and retraction movement of the stop sign component 106 (e.g., stop sign) of a status indicator assembly 1502 of the vehicle status indicator system 102.

In various embodiments, the air-powered components of the actuator device 1402 may be fluidically connected to receive air flow from an air system 1406 of the vehicle 104, for example. As shown in FIGS. 16 through 19, components of the actuator device 1402 as installed within the status indicator assembly 1502 may include an air bladder 1602 attached to a center hinge 1604 by a clevis pin 1606, for example. The center hinge 1604 can also be mechanically fastened and wedged to two cast hinges 1702, 1704 that are enclosed in a plastic blade portion of the assembly 1502. The cast hinges 1702, 1704 may be positioned adjacent to bearings pressed into the sheet metal base, for example, to maintain rotational motion of the cast hinges 1702, 1704. It can be appreciated that the hinges described in various embodiments herein may be of cast construction or manufactured in another suitably structurally effective manner, such as assembled from component parts, for example.

In operation, when it is desired to move the status indicator assembly 1502 from a closed or non-extended state to an open or extended state, air sourced from the air system 1406 can be forced into the bladder 1602 through an appropriately dimensioned orifice 1802, and the bladder 1602 can be inflated accordingly as a result. The inflating bladder 1602 applies upward force on the center hinge 1604. Because the center hinge 1604 is captively pinned on either side by the cast hinges 1702, 1704, the upward force is translated into rotational movement of the center hinge 1604. This rotational motion of the center hinge 1604 is then translated through the cast hinges 1702, 1704 to raise the plastic blade and accordingly move the sign component 106 from its non-extended state to its extended state. This rotational motion can be stopped (to avoid over extension of the status indicator assembly 1502) by a mechanical stop, for example, which may be built into the center hinges 1702, 1704.

Application of air pressure from the air system 1406 to the bladder 1602 can be discontinued, such as when it is desired to move the sign component 106 back to a non-extended state. A resiliently biased spring 1902 positioned inside of a sealed air can 1904 functions to actuate rotational motion of the center hinge 1604 in a manner which returns the sign component 106 back to its closed or non-extended state. As shown, the spring 1902 can be compressed between two steel plates and can be held in place mechanically by a bolt 1906. This mechanical fastening of the spring 1902 helps to create positive spring 1902 pressure which retains the bladder 1602 in an uninflated state when not operative to extend the sign component 106. This also resists the status indicator assembly 1502 from inadvertently or unintentionally extending in the absence of applied air pressure (e.g., as might be caused by windy environmental conditions in the vicinity of the vehicle 104).

Figure 20:
Figure 21:
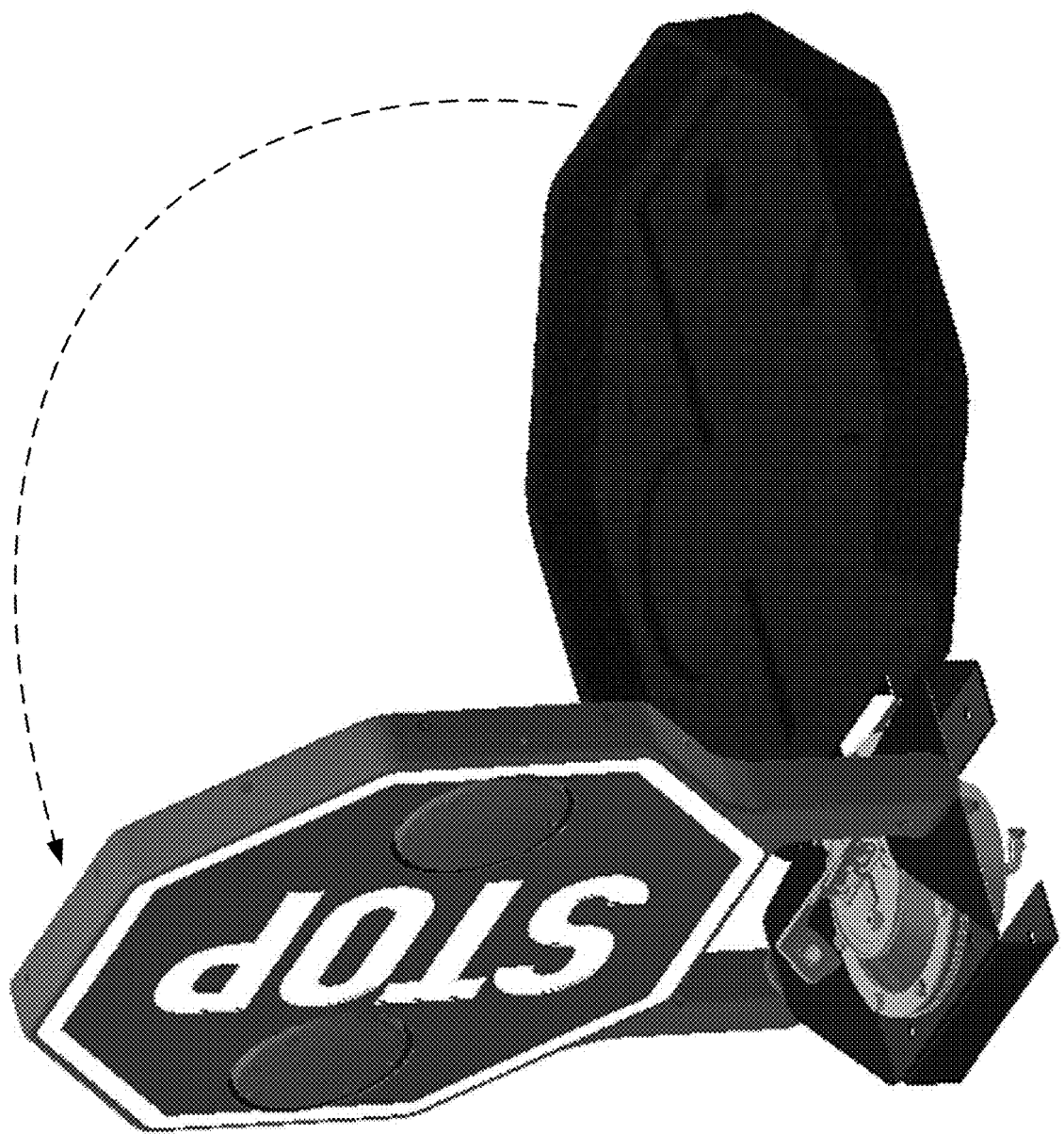
Figure 22:
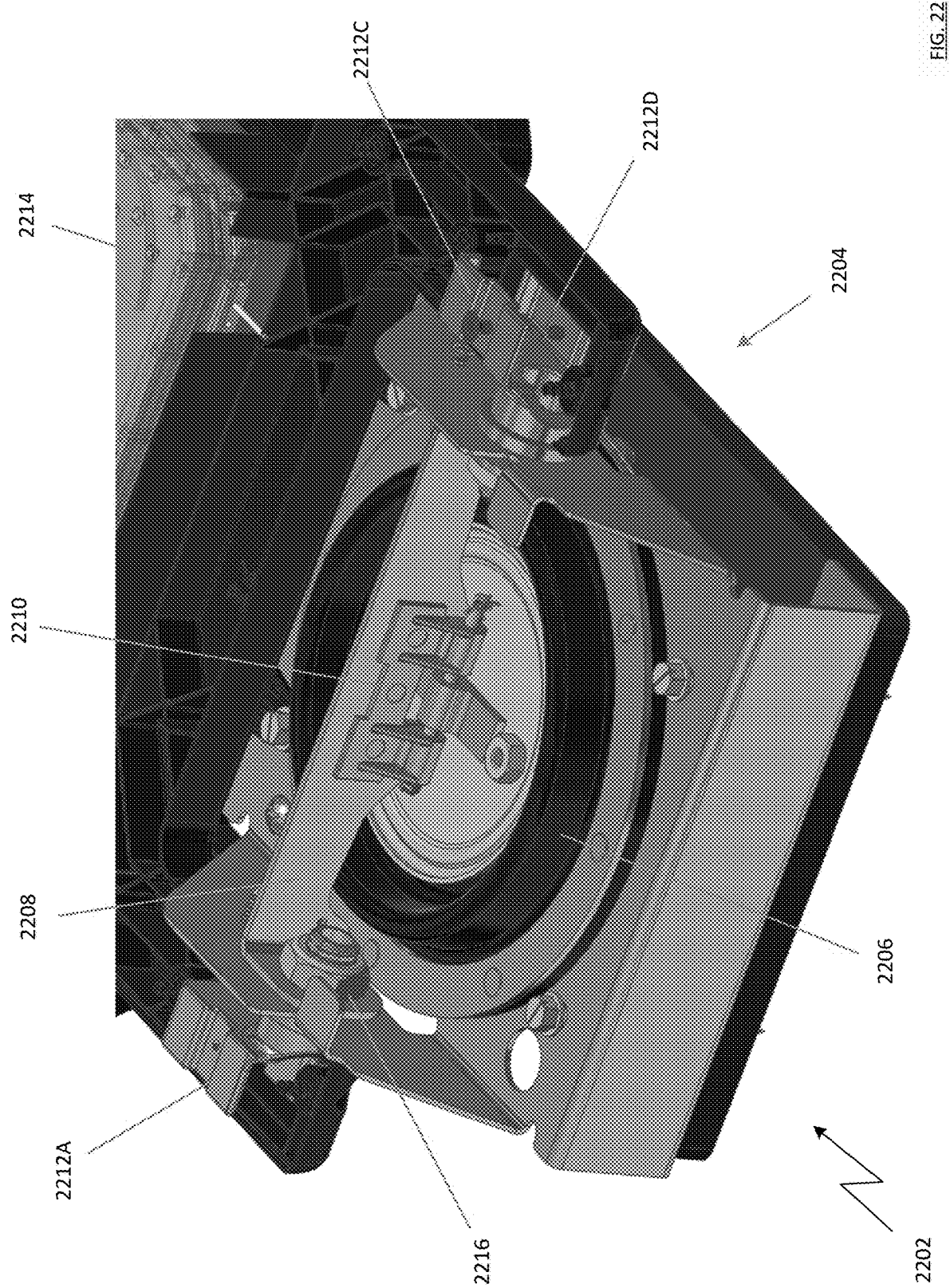
FIGS. 22 through 27 illustrate an example of a vehicle status indicator system comprising a pneumatically-driven base assembly.
Figure 23:
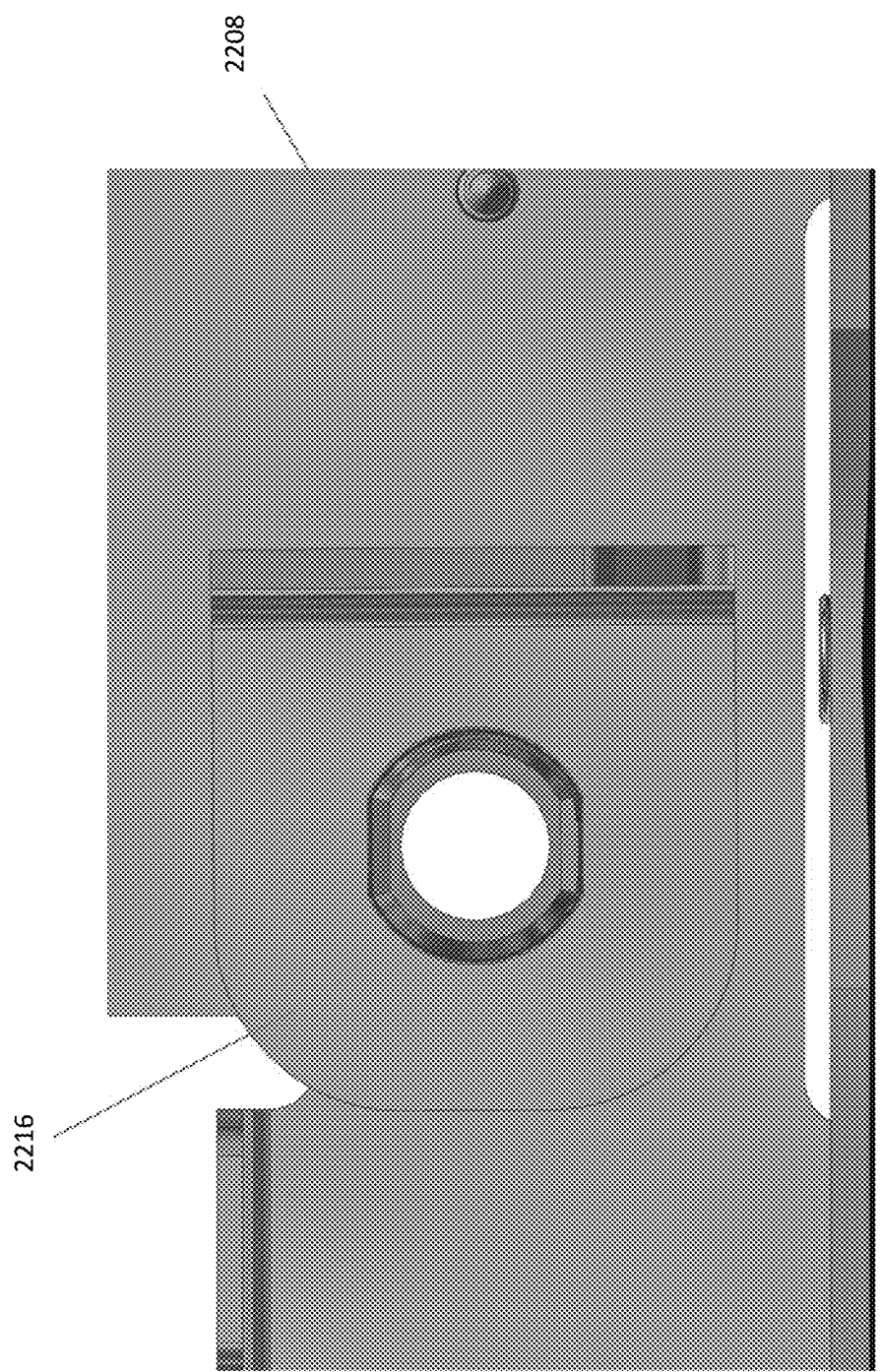
Figure 24:
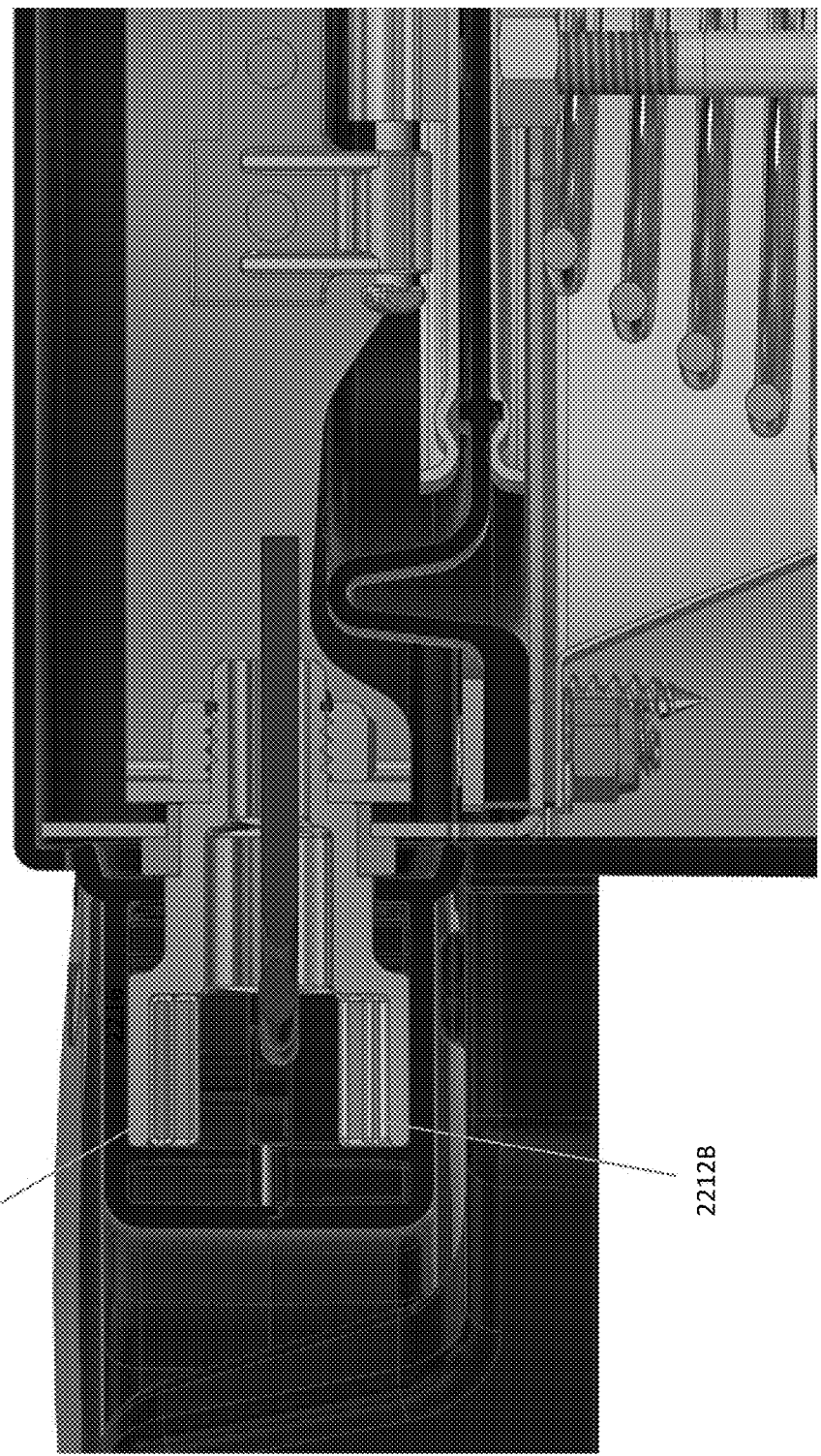
Figure 25:
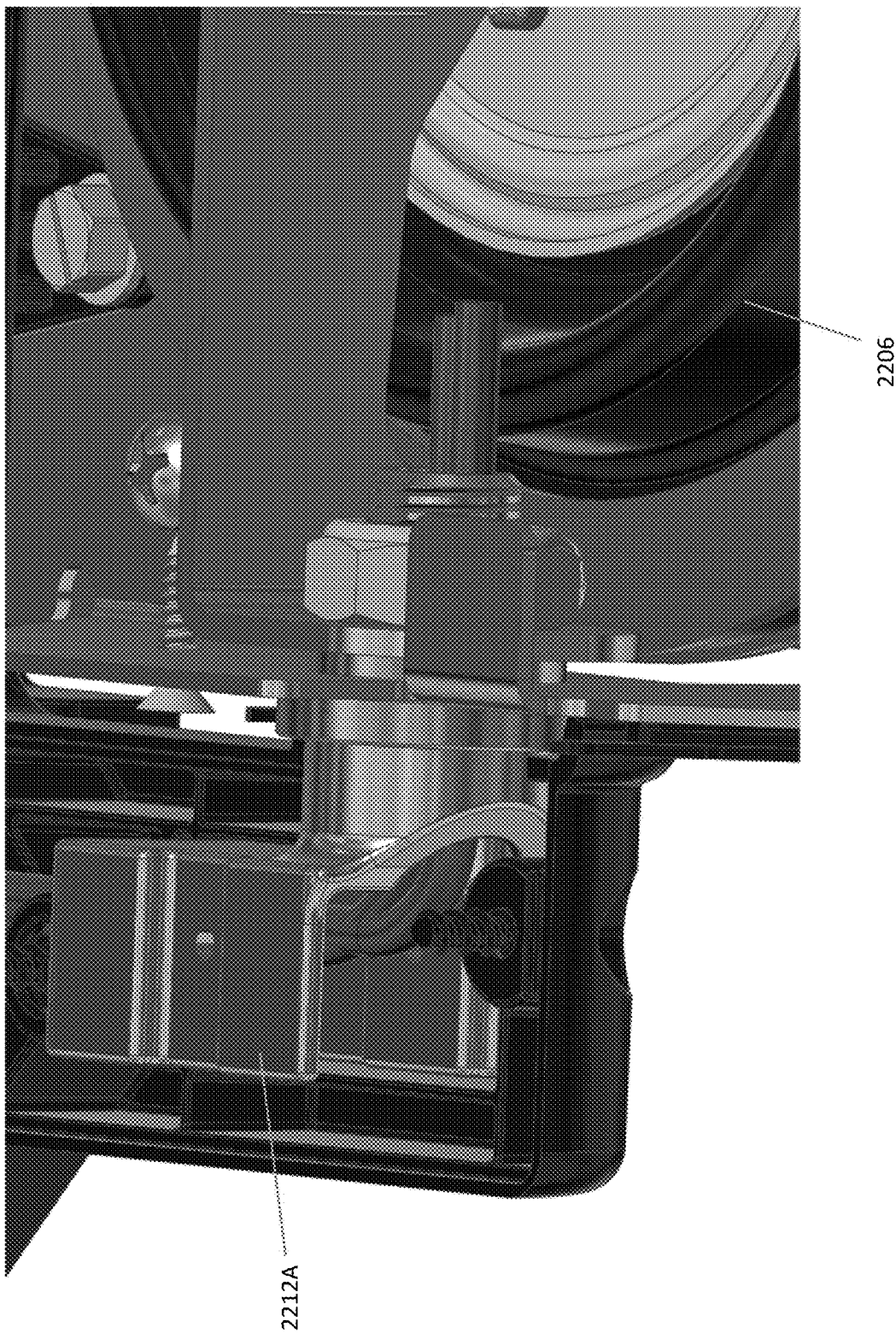

FIG. 20 includes an example of the status indicator assembly 1502 in the progress of movement from a closed or non-extended state to an open or extended state as a result of action by the actuator device 1402 described herein. FIG. 21 includes an example of the status indicator assembly 1502 with the sign component 106 in a fully open or extended state as a result of action by the actuator device 1402 described herein.

FIGS. 22 through 27 illustrate an example of a vehicle status indicator system 2202 comprising a pneumatically-driven base assembly 2204. The base assembly 2204 includes a pneumatic diaphragm 2206 connected to a hinge arm 2208 through a hinge 2210. The hinge 2210 may be a heavy duty hinge, for example, which serves as a pivot point for movement of the diaphragm 2206 when the base assembly 2204 is pressurized with air (as described below). Multiple drivers 2212A-2212D provide connection of a status indicator assembly 2214 to the hinge arm 2208 (at top and bottom portions of the status indicator assembly 2214). As shown more particularly in FIG. 23, the drivers 2212A-2212D can feature a double d tapered fit onto the hinge arm 2208 as an index for the assembly process. In certain embodiments, as shown more particularly in FIGS. 24 and 25, the drivers 2212A-2212D can feature passages through which electrical wires, for example, can be communicated to supply electrical power to illumination features of the status indicator assembly 2214 through the base assembly 2204.

Figure 26:
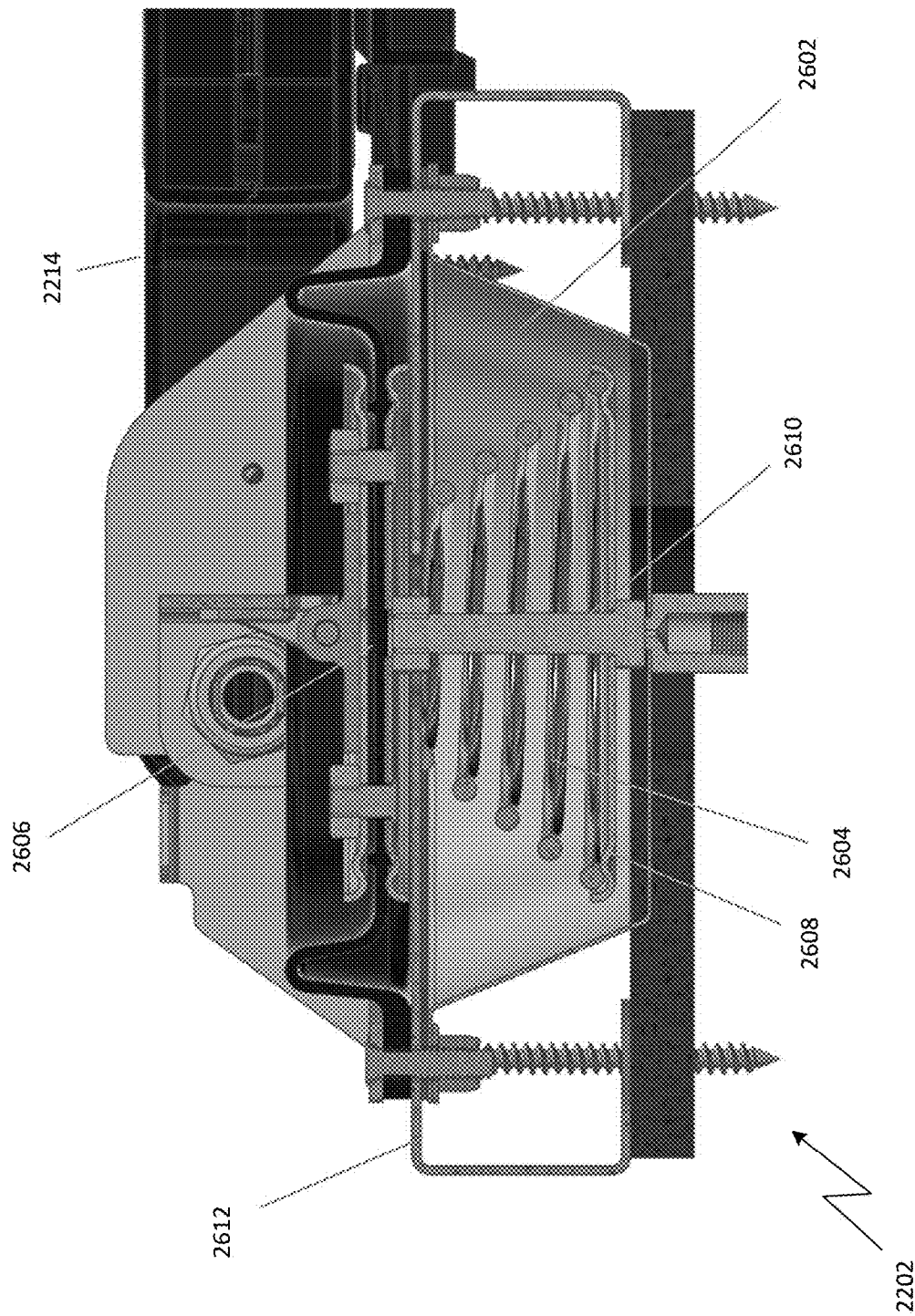

FIG. 26 illustrates an example of the vehicle status indicator system 2202 in a closed state. The base assembly 2204 includes an air can 2602 which is capable of maintaining (and releasing) suitably effective air pressure for transitioning from the closed state (when unpressurized) to an open state (when pressurized) of the system 2202. A return spring 2604 can be positioned within the base assembly 2204 which can be connected to the diaphragm 2206 with a nut/plate structural arrangement 2606, for example. A retaining plate 2608 and bolt 2610 arrangement can be provided to compress the spring 2604 to create pretension for the spring 2604 and effectively maintain the closed state when the air can 2602 is not pressurized. Also, the spring 2604 can exert force against a metal bracket 2612 of the base assembly 2204 and the retaining plate 2608 to assist with closing force when the spring 2604 is compressed in the closed state. Those skilled in the art can appreciated how a comparatively lower profile internal return spring 2604 allows for a more beneficially compact air assembly.

Figure 27:
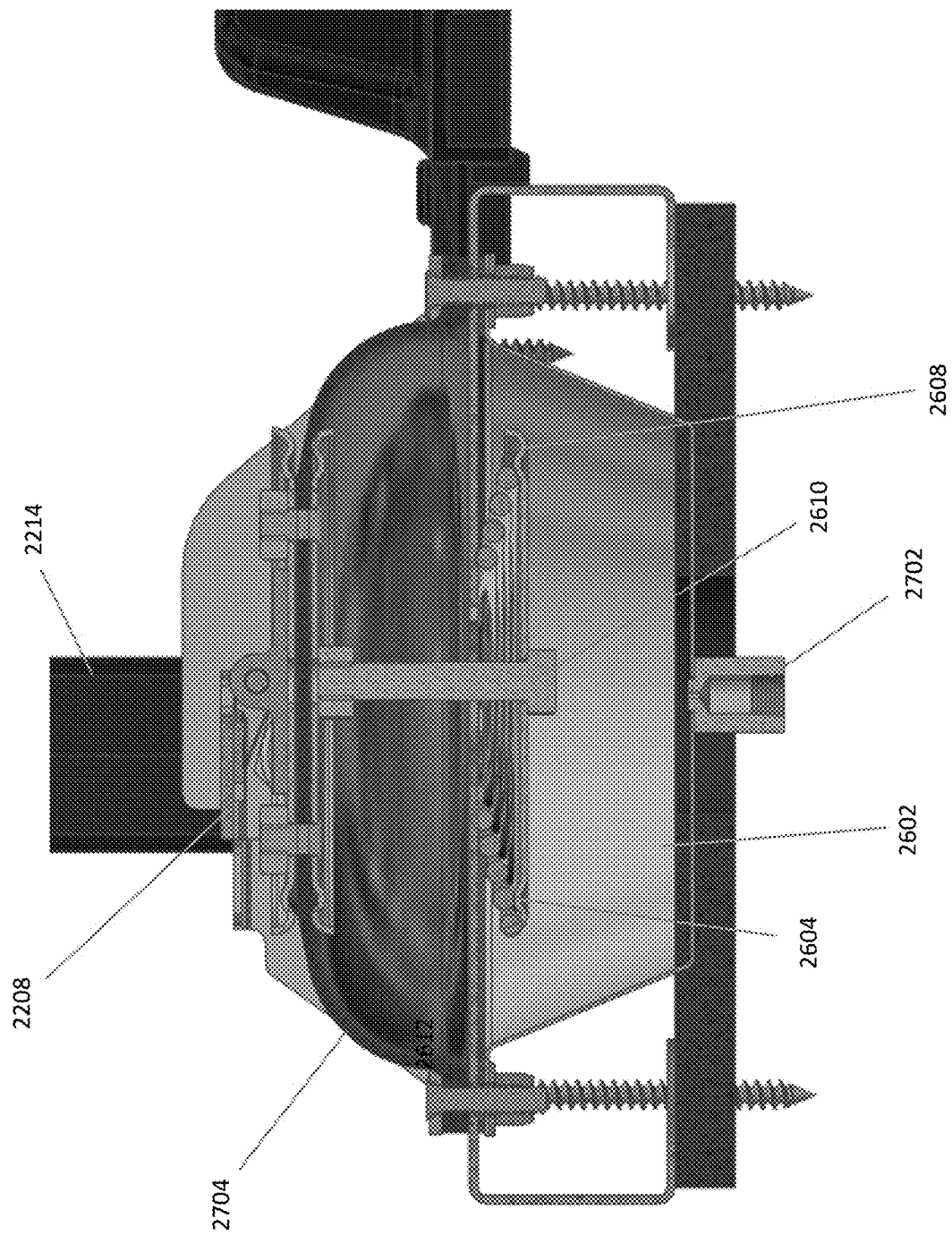

FIG. 27 illustrates an example of the vehicle status indicator system 2202 transitioned to an open state when air pressure is communicated to the air can 2602 through an air pressure fitting 2702. Air pressure may be supplied to the fitting 2702 from a source of air pressure associated with a vehicle on which the vehicle status indicator system 2202 has been installed, from a cannister supply of pressurized air, and/or other suitable sources of air pressure. When the air can 2602 is pressurized, an air bladder 2704 can become fully or substantially fully inflated by the air pressure, as shown. In response to the introduction of pressurized air, the retaining plate 2608 and bolt 2610 arrangement force the return spring 2604 into a further compressed position, as shown. This compression increases the return force of the spring 2604 which will assist the action of the base assembly 2204 with returning the system 2202 to a closed state when air pressure is released in the air can 2602. When the air can 2602 is pressurized, the connection of the diaphragm 2206 to the hinge arm 2208 through the hinge 2210 results in rotation of the status indicator assembly 2214 from the closed state to the open state (typically from about zero degrees to about ninety degrees of rotation).

Figure 28:
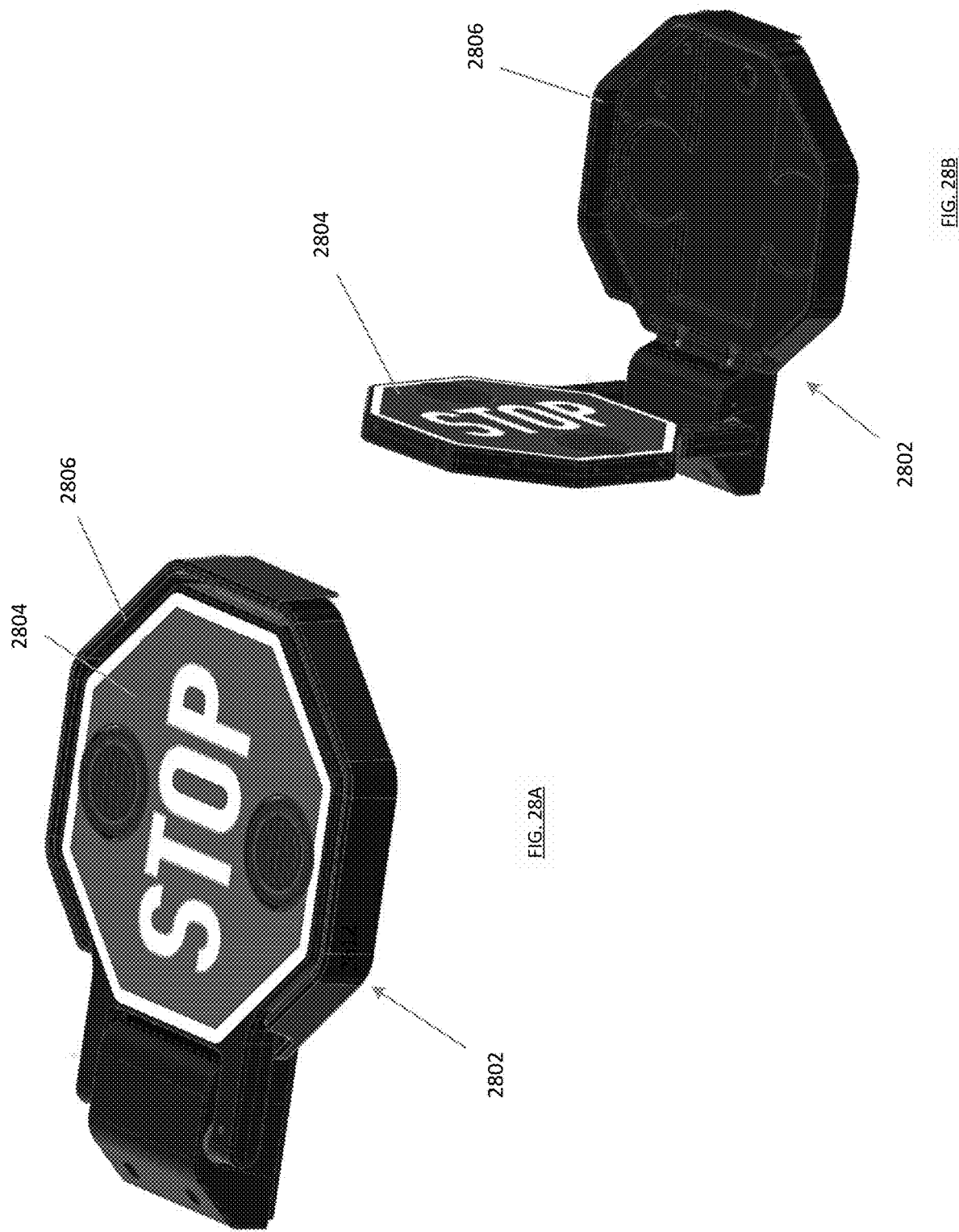
FIGS. 28A and 28B include an example of another arrangement involving a vehicle status indicator system and a status indicator assembly with a wind guard feature.

FIGS. 28A and 28B include an example of another arrangement involving a vehicle status indicator system 2802 and a status indicator assembly 2804. In this example, a wind guard 2806 is formed around at least a portion of a periphery of the status indicator assembly 2804. The wind guard 2806 has a height and structure which are dimensioned to create a recess in which the status indicator assembly 2804 recedes in a closed state of the system 2802. It can be seen that the wind guard 2806 can protect the assembly 2804 from pressure differentials in the closed state. For example, the wind guard 2806 helps to resist phantom openings and undesired oscillations which can arise from vehicle speed, cross winds, weather, or other environmental or operating conditions of the system 2802.

Figure 29:
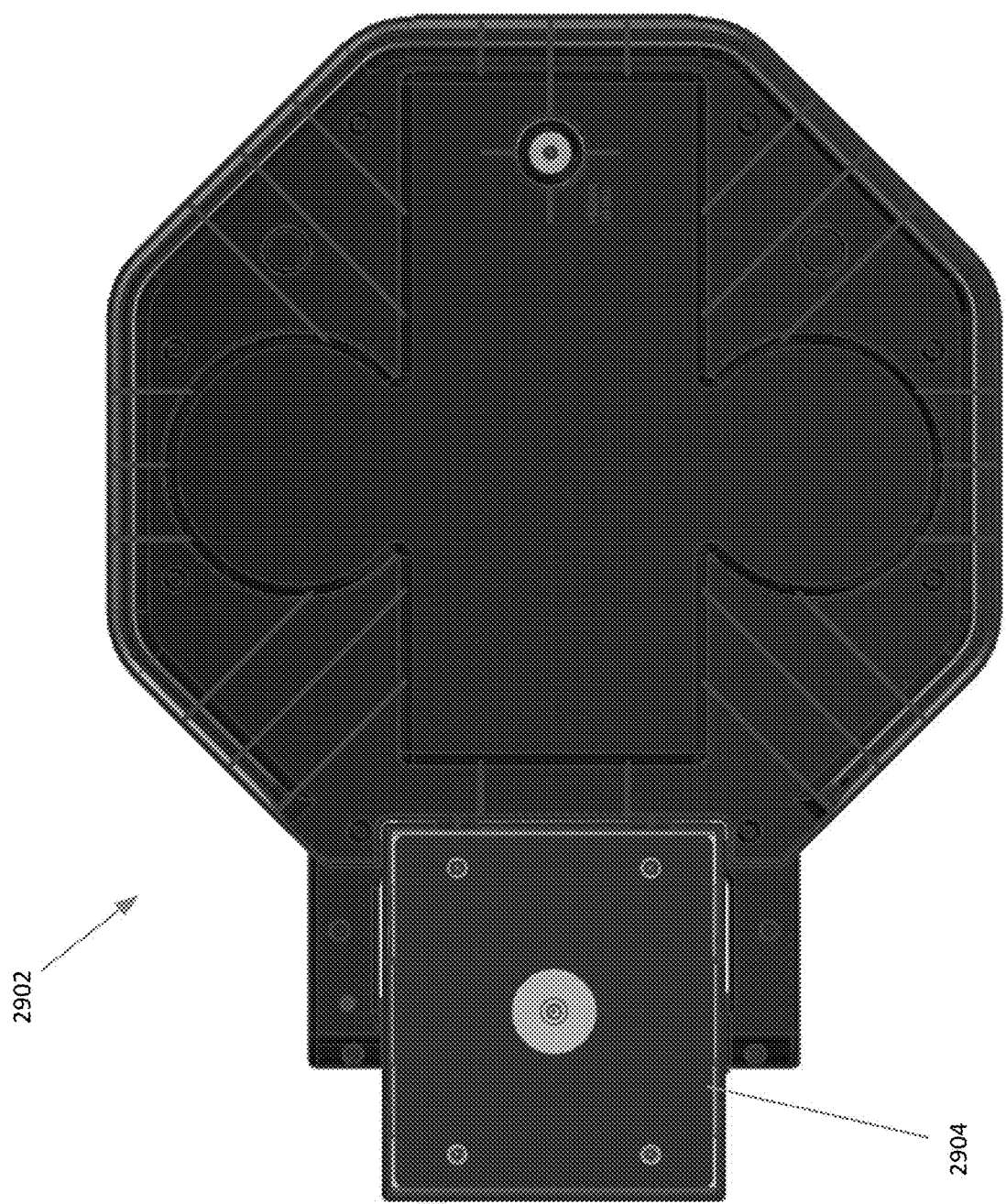
FIG. 29 includes an example of a portion of a vehicle status indicator system which is installed onto a vehicle for use.
Figure 30:
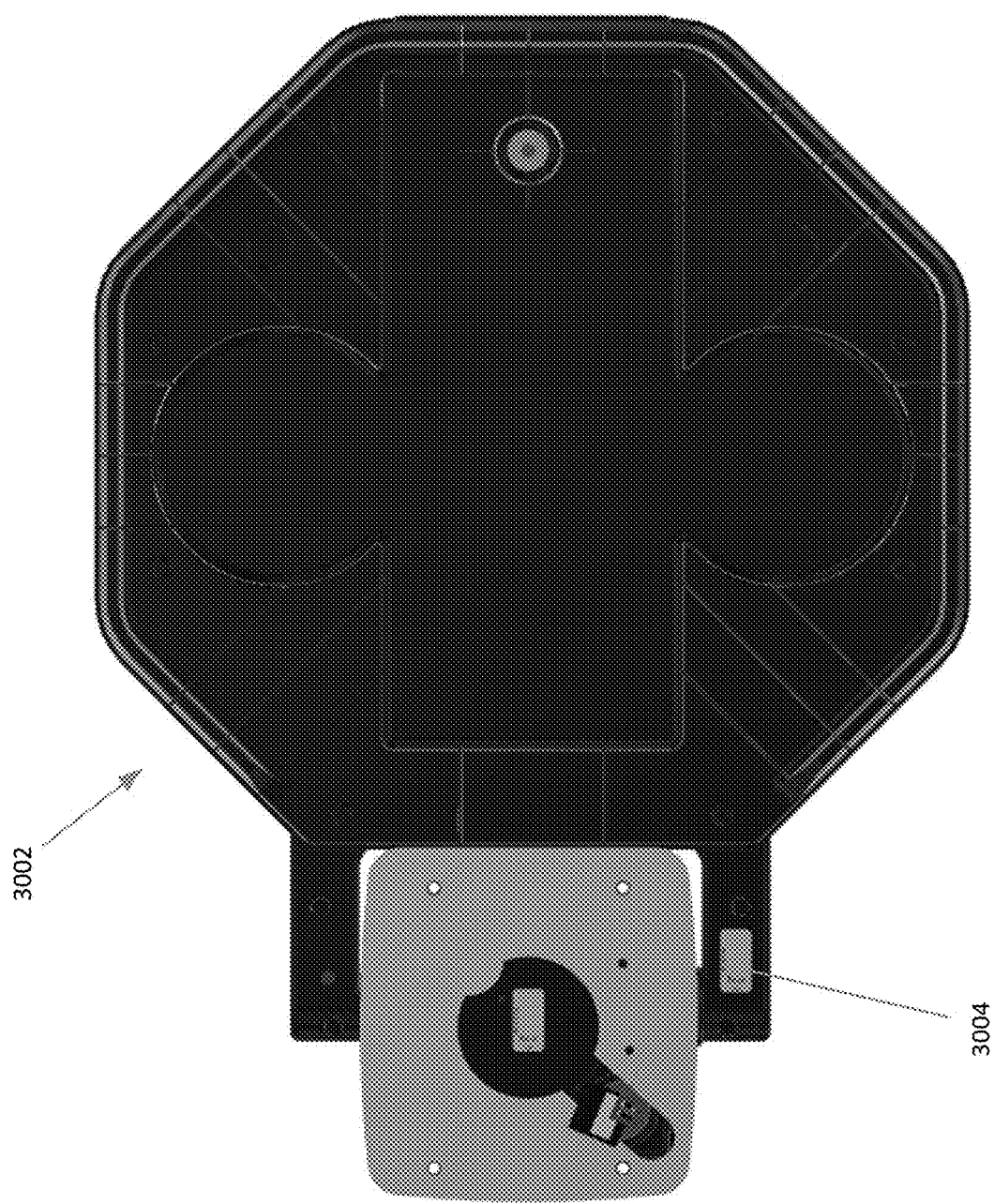
FIG. 30 includes an example of a portion of a vehicle status indicator system which is installed onto a vehicle for use.

FIG. 29 includes an example of a portion of a vehicle status indicator system 2902 which is installed onto a vehicle for use. Likewise, FIG. 30 includes an example of a portion of a vehicle status indicator system 3002 which is installed onto a vehicle for use. A mounting bracket 2904 of the system 2902 interfaces for installation with the side of a vehicle, for example, and a mounting bracket 3004 interfaces with the side of a vehicle for similar installation. Depending on the desired vehicle installation, one of the systems 2902, 3002 may be pneumatically actuated, for example, and the other may be electrically actuated (e.g., by electric motor). In each installation, each mounting bracket 2904, 3004 may have the same or substantially the same base mounting pattern (e.g., holes positioned in a substantially similar or the same geometry). It can be seen how this beneficially facilitates ready and convenient assembly of the systems 2902, 3002 onto their respective vehicles during the production and assembly process. Original equipment manufacturers can minimize variation in their manufacturing and assembly processes. Also, end user can upgrade products without requiring additional complicated components or creating excessive holes, for example, in the bodies of their vehicles.

Figure 31:
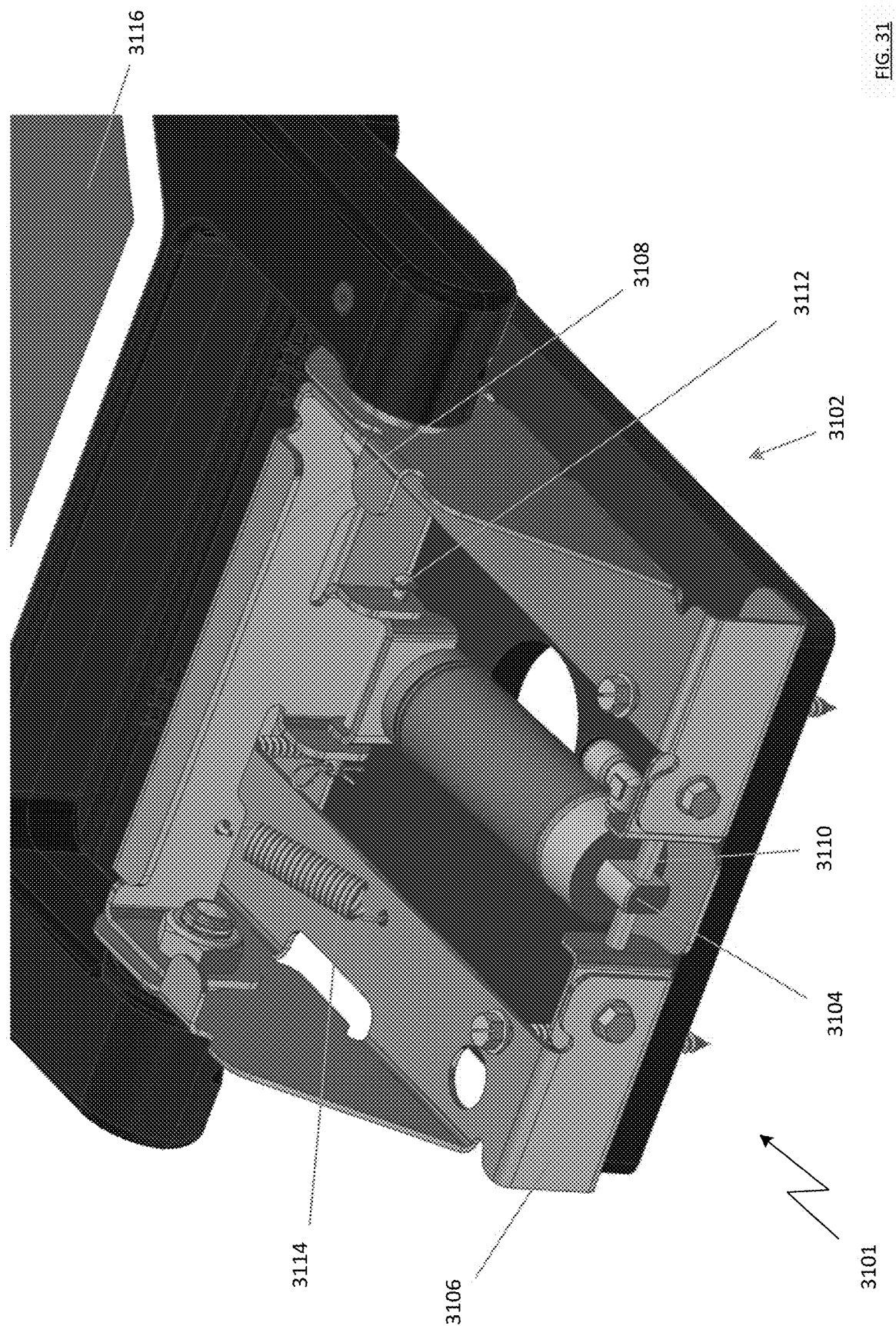
Figure 32:
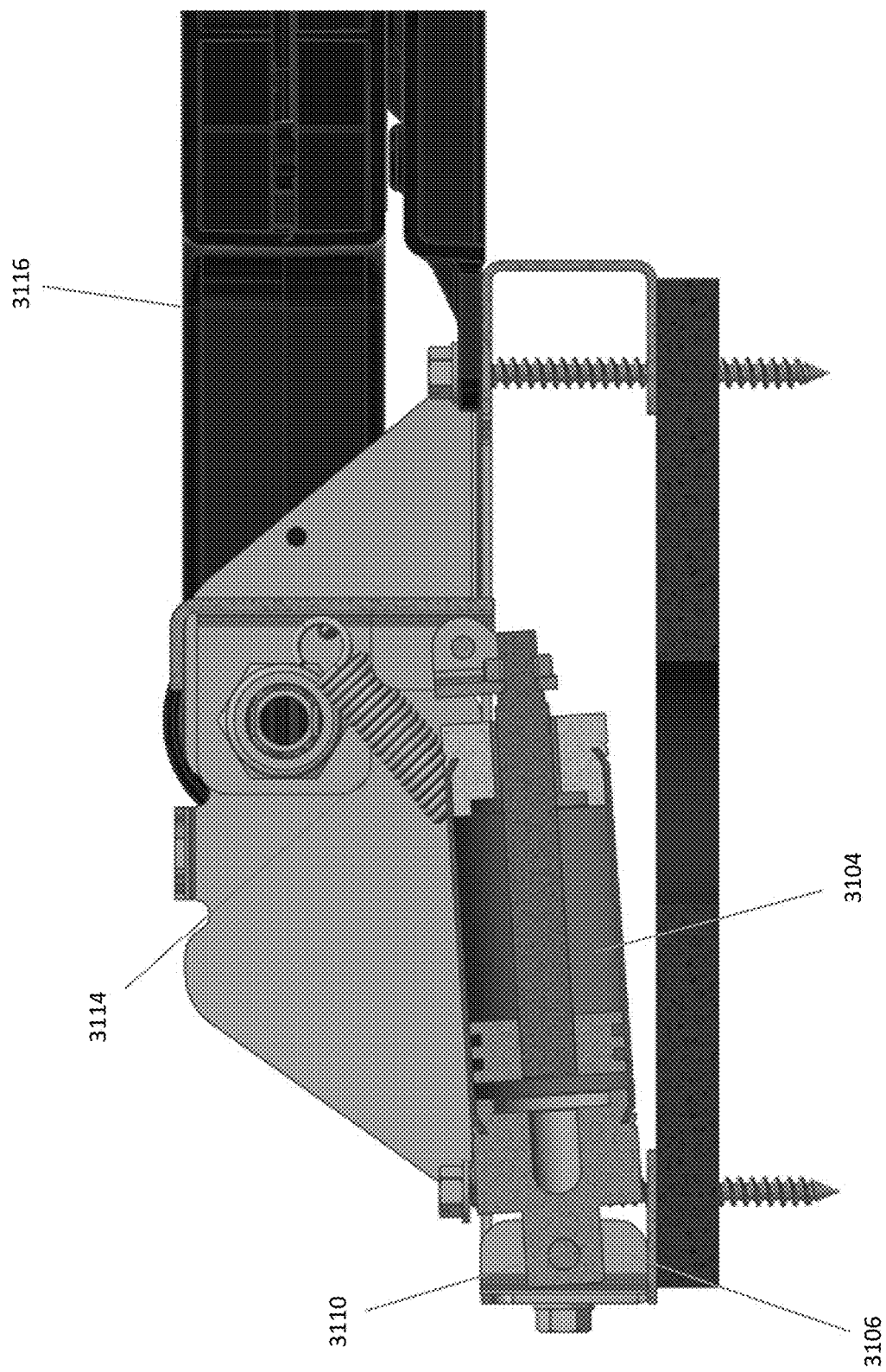

FIGS. 31 through 33 illustrate another example of a vehicle status indicator system 3101 comprising a pneumatically actuated base assembly 3102. The assembly 3102 includes an air cylinder 3104 which can be attached to both a base bracket 3106 and a hinge arm 3108 by use of pins 3110, 3112, for example. A return spring 3114 can be attached to both the base bracket 3106 and a hinge arm 3108 of the base assembly 3102. The return spring 3114 can be structured to promote retaining or closing a status indicator assembly 3116 in a closed state of the system 3101. With particular reference to FIG. 33, when the cylinder 3104 is pressurized with air, the cylinder 3104 pivots at its mounting point with the base bracket 3106, as shown. The status indicatory assembly 3116 can then rotate about a hinge pivot point 3302 to extend the status indicator assembly 3116 to its open or extended state from the closed state.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system configurations or component structures described herein are necessarily intended to limit the scope of the invention, unless such aspects are specifically included in the claims.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g., "such as" or "for example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A vehicle status indicator system comprising:
    a status indicator assembly including a sign component comprising two blades each having background portions and at least one light generation component;
    an actuation device configured to alternately retain the sign component of the status indicator assembly in a closed state or extend the sign component in an open state;
    the light generation component comprising:
        a first backstop having at least a portion of a message representation impressed thereon,
        a second backstop having at least a portion of a message representation impressed thereon,
        at least one circuit board encased between the first and second backstops, the circuit board comprising:
            at least one light emitting diode corresponding to the message representation portion of the first backstop providing a backlight source to the message representation portion of the first backstop, and
            at least one light emitting diode corresponding to the message representation portion of the second backstop providing a backlight source to the message representation portion of the second backstop,
        a first decal covering at least the message representation impressed on the first backstop, wherein a message representation portion of the second decal corresponds to the message representation impressed on the first backstop,
        a second decal covering at least the message representation impressed on the second backstop, wherein a message representation portion of the second decal corresponds to the message representation impressed on the second backstop, and
        wherein no illumination source corresponds to the backgrounds of the blades of the sign component,
    wherein the backstops are structured to provide an encasement for the circuit board to resist contaminants from entering the light generation component; and
    the system configured for installation on a vehicle.

2. The system of claim 1, wherein the vehicle comprises a school bus.

3. The system of claim 1, wherein the vehicle comprises at least one of an ambulance, a fire truck, a construction vehicle, a passenger train, a watercraft, and/or an aircraft.

4. The system of claim 1, wherein the circuit board of the light generation component comprises multiple light-emitting diodes positioned on both sides of the circuit board.

5. The system of claim 1, wherein the circuit board comprises at least two circuit board portions wherein:
    a first circuit board portion comprises at least one light emitting diode corresponding to the message representation portion of the first backstop providing a backlight source to the message representation portion of the first backstop; and
    a second circuit board portion comprises at least one light emitting diode corresponding to the message representation portion of the second backstop providing a backlight source to the message representation portion of the second backstop.

6. The system of claim 1, wherein the circuit board comprises an integrated LED driver circuit.

7. The system of claim 1, wherein the actuator device comprises a pneumatically powered actuator device configured to alternately retain the sign component of the status indicator assembly in a closed state or extend the sign component in an open state.

8. The system of claim 7, wherein the pneumatically powered actuator device is fluidically connected to receive air flow or pressurized air from an air system of the vehicle.

9. The system of claim 8, wherein the pneumatically powered actuator device further includes:
    a diaphragm including an air bladder capable of air pressurization from the air system of the vehicle;
    a return spring attached to a portion of the diaphragm;
    a rotatable pivot connection between a portion of the diaphragm and a portion of the sign component, wherein:
        when sufficient air pressure is applied to the air bladder compression of the return spring causes rotation of the rotatable pivot connection which causes extension of the sign component from a closed state to an open state, and
        when the air pressure in the air bladder is sufficiently released, the return spring extends to cause rotation of the rotatable pivot connection which causes movement of the sign component from the open state to the closed state.

10. The system of claim 9, wherein the return spring is compressed between two steel plates and held in place mechanically by a bolt.

11. The system of claim 9, further comprising multiple drivers structured to provide the rotatable pivot connection between the sign component of the status indicator assembly and the diaphragm.

12. The system of claim 11, wherein at least one driver includes a passage therethrough for communication of at least on electrical wire.

13. The system of claim 1, further comprising a wind guard formed around at least a portion of a periphery of the status indicator assembly.

14. The system of claim 1, further comprising a mounting bracket structured for installation of the vehicle status indicator system on a vehicle of both an electrically actuated actuation device and a pneumatically actuated actuation device.

15. The system of claim 7, wherein the actuation device comprises a pneumatically actuated base assembly including:
- an air cylinder attached at a base bracket at a first pivot connection and at a hinge arm at a second pivot connection;
- a return spring attached to the base bracket and the hinge arm, the return spring structured to promote retaining the sign component of the status indicator assembly in a closed state of the system; and wherein:
- when the air cylinder is pressurized with air, the cylinder pivots at the first pivot connection with the base bracket, and
- the sign component can then rotate about the second pivot connection at the hinge arm to extend the sign component to its open state from the closed state.

16. The system of claim 1, further comprising the light generation component further comprising:
- at least one upper light element,
- at least one lower light element,
- at least one main light element, and
- an illumination timing device programmed:
  - to illuminate or activate the upper light element alternately on/off with respect to activation of the lower light element, and
  - to alternatively activate/deactivate the main element in timing with activation/deactivation of the upper light element and the lower light element.

17. The system of claim 16, further comprising the illumination timing device programmed to activate the main element during an entire duty cycle of illuminating the sign component, while alternately activating/deactivating the upper light element and the lower light element at a predetermined frequency.

* * * * *